(12) United States Patent
Ito

(10) Patent No.: US 8,160,662 B2
(45) Date of Patent: Apr. 17, 2012

(54) SLIDE DEVICE AND ELECTRONIC EQUIPMENT

(75) Inventor: Hisanori Ito, Hino (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 504 days.

(21) Appl. No.: 12/405,960

(22) Filed: Mar. 17, 2009

(65) Prior Publication Data

US 2009/0247248 A1  Oct. 1, 2009

(30) Foreign Application Priority Data

Mar. 27, 2008  (JP) .................................. 2008-083648

(51) Int. Cl.
*H01Q 1/24* (2006.01)
*H04M 1/00* (2006.01)
(52) U.S. Cl. ................... 455/575.4; 455/575.1; 361/814
(58) Field of Classification Search ............... 455/575.4, 455/575.1; 361/814, 600; 16/69, 53; 343/702
See application file for complete search history.

(56) References Cited

U.S. PATENT DOCUMENTS

| 2005/0250563 | A1* | 11/2005 | Nan .......................... 455/575.4 |
| 2006/0114646 | A1 | 6/2006 | Koibuchi et al. |
| 2007/0155447 | A1* | 7/2007 | Gordecki ................... 455/575.4 |
| 2007/0204431 | A1* | 9/2007 | Scherling et al. ................. 16/69 |

FOREIGN PATENT DOCUMENTS

JP   2007-49650   2/2007

* cited by examiner

*Primary Examiner* — Daniel D Chang
(74) *Attorney, Agent, or Firm* — Cozen O'Connor

(57) ABSTRACT

A slide device includes a base, a slider provided at the base and slidable along an axis serving as a y-axis with respect to the base, a cam provided at the base and having a surface undulating in an x-axis direction orthogonal to the y-axis, a cam follower provided at the slider and capable of moving from a position corresponding to one end of the cam in the x-axis direction to a position corresponding to the other end, and an urging mechanism urging the cam follower towards the cam such that the cam follower slides around the cam in one direction in accompaniment with the sliding of the slider with respect to the base. Further, electronic equipment includes a front casing, a rear casing facing a rear surface of the front casing, and the slide device described above.

11 Claims, 19 Drawing Sheets

SLIDE DEVICE AND ELECTRONIC EQUIPMENT

BACKGROUND OF THE INVENTION

1. Field of the Invention

The present invention relates to a slide device and electronic equipment, and particularly relates to a slide device and electronic equipment capable of causing a slider or casing to move at a low load.

2. Description of the Related Art

Slider type mobile telephones have become widespread in recent years. A rear surface of a front casing and a front surface of a rear casing of such mobile telephones are connected by a slide device. It is then possible to slide the front casing vertically with respect to the rear casing. An urging mechanism is then typically utilized in order to move the front casing at a low load.

For example: with a mobile telephone as disclosed in Unexamined Japanese Patent Application KOKAI Publication No. 2007-49650, referring to FIGS. 5 and 6 of the literature, a slide member (10) is fitted to a front casing (1) and is coupled so as to be vertically slidable with respect to a rear casing (2). A quadrilateral shaped cam (5) having a pair of left and right angled cam surfaces (4) extending vertically is provided at the rear casing (2). A pair of left and right cam followers (7) is also provided at the slide member (10) so as to be capable of moving in a lateral direction. A spring (8) is dropped in between the pair of cam followers (7). This means that the pair of cam followers (7) sandwich the cam (5) from the left and right so as to press against a pair of cam surfaces (4). When the front casing (1) is slid upwards from a state where the mobile telephone is closed, the pair of cam followers (7) slides over the angled cam surfaces (4) and the spring (8) is stretched out. When the pair of cam followers (7) then travels over the apexes of the angled cam surfaces (4), the pair of cam followers (7) slides upwards due to the force of the spring (8) and the reactive force of the cam surfaces (4) so that the front casing (1) is automatically made to slide upwards. Similarly, when the front casing (1) is slid downwards from a state where the mobile telephone is opened, when the pair of cam followers (7) travels over the apexes of the angled cam surfaces (4), the front casing (1) is automatically slid downwards.

According to the above urging mechanism, the cam followers (7) slide over the same cam surfaces (4) regardless of whether the mobile telephone is opened or closed. This means that the position of the front casing (1) when the cam followers (7) travel over the apexes of the angled cam surface (4) is the same when opening or closing the mobile telephone. Therefore, when the apexes of the cam surfaces (4) are positioned closer to the lower end than to the upper end of the cam (5), the distance that the front casing (1) slides upwards against the force of the spring (8) becomes short and the distance that the front casing (1) automatically slides upwards becomes long in opening the mobile telephone. This means that the operation of opening the mobile telephone becomes easy for the user. On the other hand, however, the distance that the front casing (1) slides downwards against the force of the spring (8) becomes long and the distance that the front casing (1) automatically slides downwards becomes short in closing the mobile telephone. This means that the operation of closing the mobile telephone becomes difficult for the user.

Conversely, when the apexes of the cam surfaces (4) are positioned closer to the upper end than to the lower end of the cam (5), the operation of closing the mobile telephone becomes easy, but the operation of opening becomes difficult.

SUMMARY OF THE INVENTION

In order to resolve the above problems, it is an object of the present invention to make it possible to individually set distances that a front casing automatically slides when opening and closing a slider type mobile telephone.

In order to achieve the above object, a slide device according to the present invention is a slide device comprising:

a base;

a slider provided at the base and slidable along an axis serving as a y-axis with respect to the base;

a cam provided at the base and having a surface undulating in an x-axis direction orthogonal to the y-axis;

a cam follower provided at the slider and capable of moving from a position corresponding to one end of the cam in the x-axis direction to a position corresponding to the other end; and an urging mechanism urging the cam follower towards the cam such that the cam follower slides around the cam in one direction in accompaniment with the sliding of the slider with respect to the base.

Further, electronic equipment according to the present invention is electronic equipment comprising:

a front casing;

a rear casing facing a rear surface of the front casing; and the slide device described above, wherein the base is fitted to a rear surface of the front casing, and the slider is fitted to a front surface of the rear casing.

According to the present invention, it is possible to set a distance that the slider slides in resistance to the urging mechanism and a distance that the slider slides automatically with assistance of the urging mechanism, independently for each direction of sliding of the slider.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Figure 1:
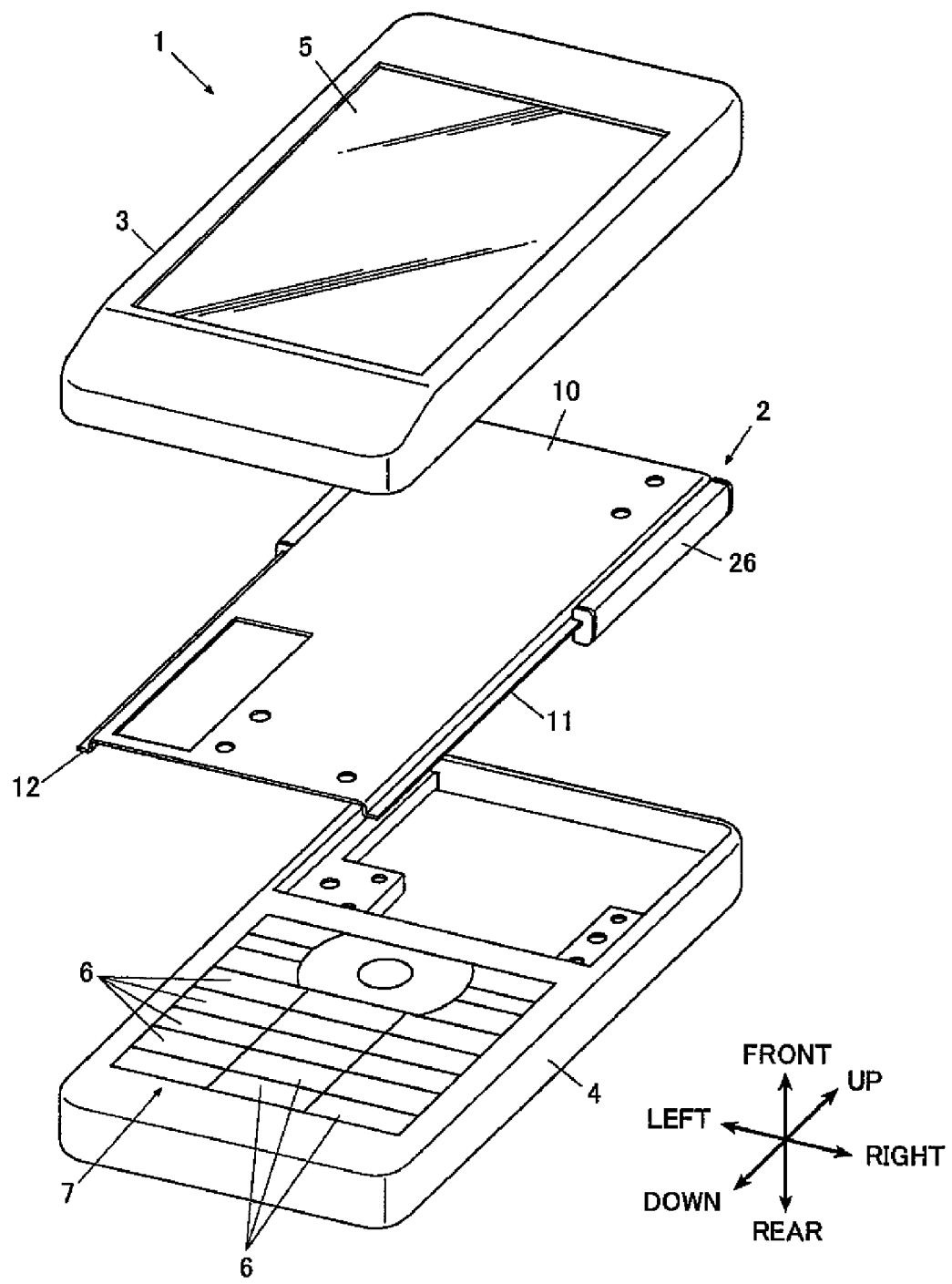
FIG. 1 is an exploded perspective view of electronic equipment of a first embodiment of the present invention.

The following is an explanation using the drawings of preferred embodiments for implementing the present invention. Various preferred technological limitations are imposed in order to exemplify the present invention in the embodiments described below but the scope of the present invention is not limited to the embodiments and exemplary examples explained below.

The vertical direction shown in the drawings corresponds to the y-axis direction, both upwards and downwards respectively corresponding to a plus side and a minus side of the y-axis direction. The lateral direction shown in the drawings corresponds to the x-axis direction, with the left and right corresponding to the minus side and the plus side of the x-axis direction, respectively.

First Embodiment

FIG. 1 is an exploded perspective view of the front surface, the lower surface, and the right side surface of electronic equipment 1 of a first embodiment of the present invention.

The electronic equipment 1 is a mobile telephone, personal computer, digital camera, PDA (Personal Digital Assistance), electronic notebook, mobile wireless equipment, or other electronic equipment. The electronic equipment 1 includes a slide device 2, and a front casing 3 and a rear casing 4 coupled so as to be mutually slidable using the slide device 2.

A display unit 5 having a liquid crystal display or an EL display etc. is provided at the front surface of the front casing 3. An input unit 7 constituted by a plurality of pushbuttons 6 is provided at a lower part of the front surface of the rear casing 4.

Figure 2:
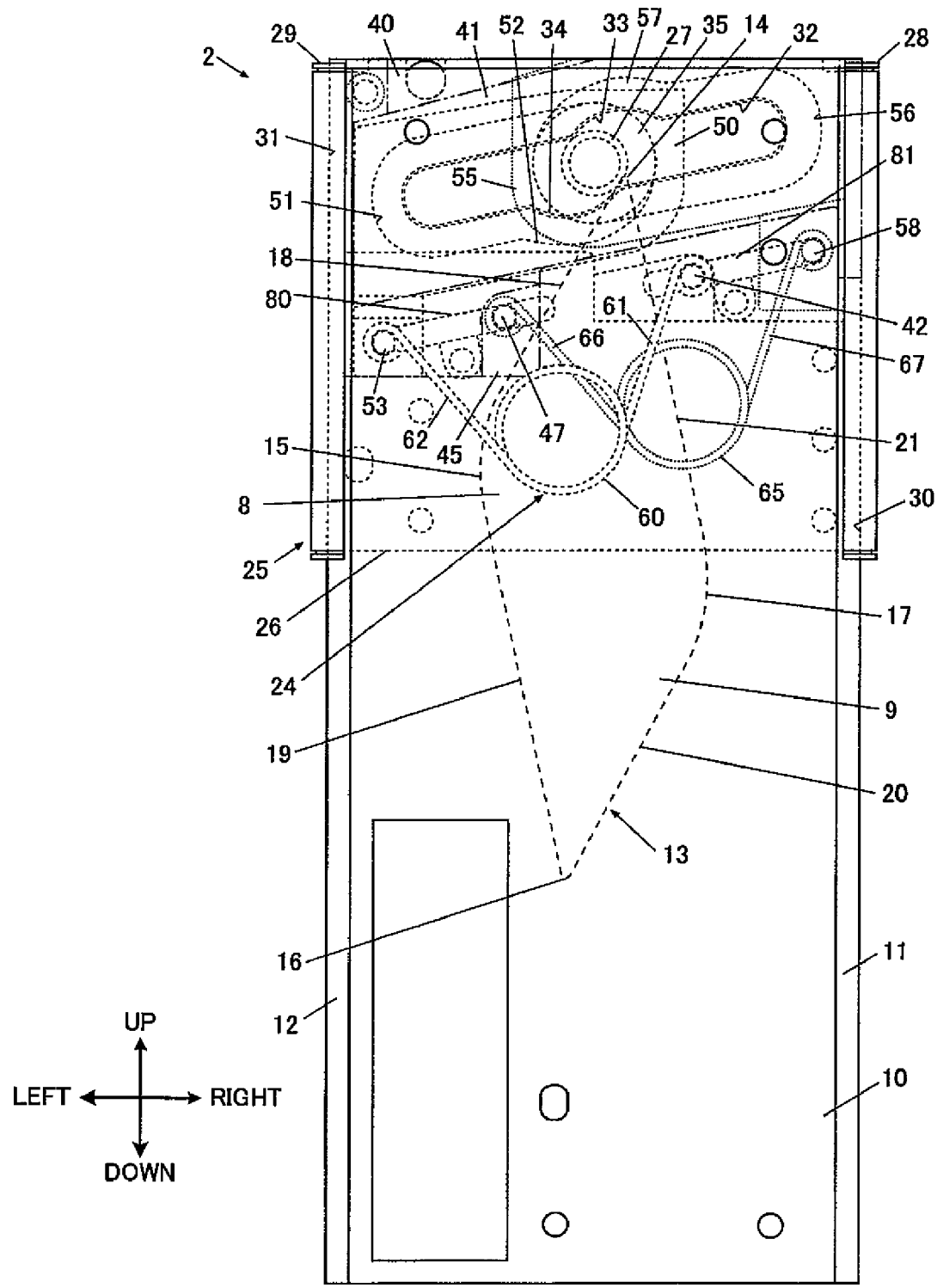
FIG. 2 is a front view of a slide device of the first embodiment of the present invention.
Figure 3:
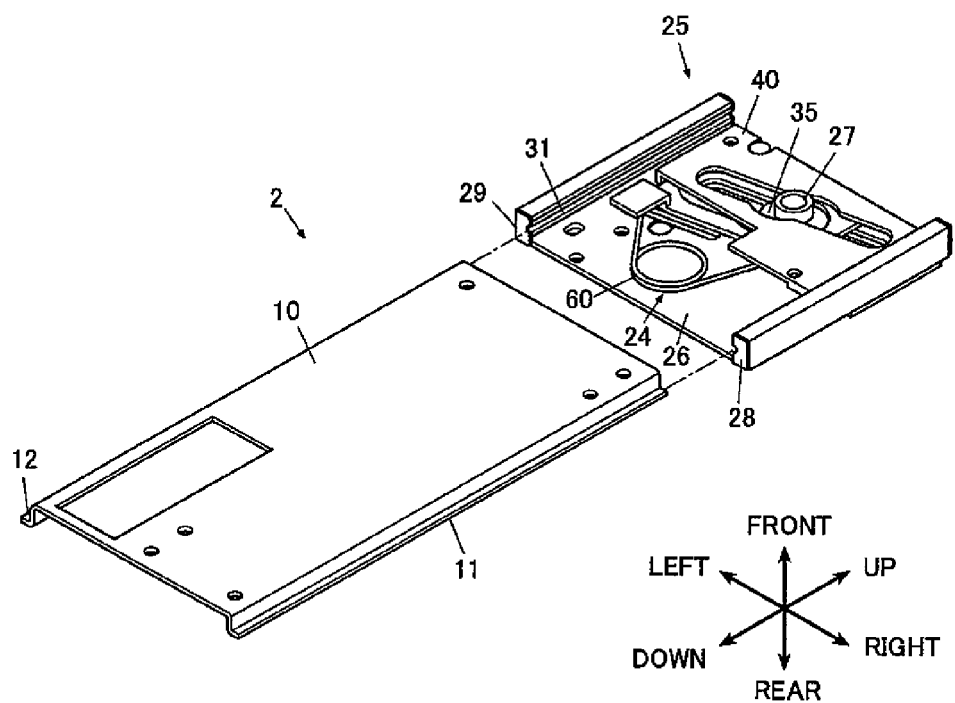
FIG. 3 is an exploded perspective view of the slide device.

FIG. 2 is a front view of the slide device 2. FIG. 3 is an exploded perspective view of the slide device 2 in a partially cutaway state.

The slide device 2 includes a thin, plate-shaped base 10, a cam 13 provided at a rear surface of the base 10, and a carriage unit 25 fitted to the base 10 so as to be capable of moving vertically with respect to the base 10.

Guide rails 11 and 12 are formed in the shape of straight lines in a vertical direction at both the left and right ends of the base 10. The base 10 is made of metal so as to include the guide rails 11 and 12 on both sides. As shown in FIG. 1, the base 10 is fitted to the rear surface of the front casing 3.

Figure 4:
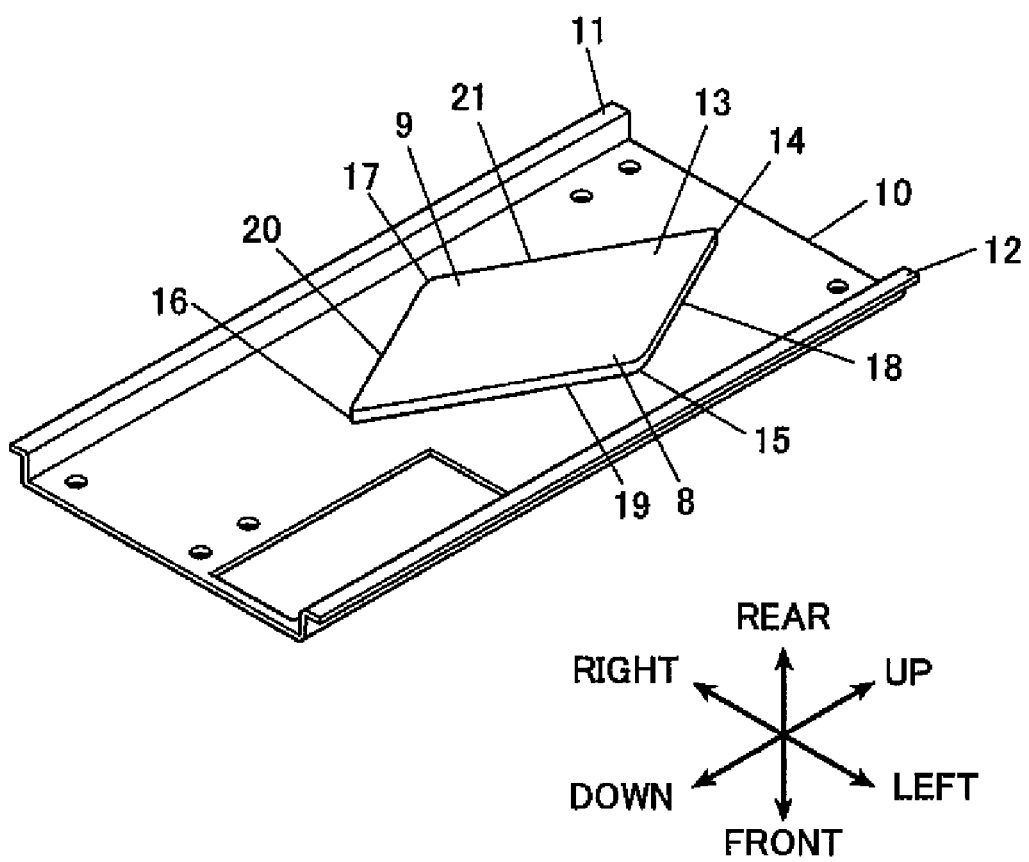
FIG. 4 is a perspective view of a base of the slide device.

FIG. 4 is a perspective view showing the rear surface, left side surface, and lower surface of the base 10. As shown in FIGS. 2 and 4, the cam 13 is provided at the lateral center of the base 10 but is provided slightly above the vertical center of the base 10. The cam 13 is a circumscribing cam that appears quadrilateral in shape when viewed from the front surface, and is specifically a parallelogram. The cam 13 has four apex's 14 to 17, with an apex 14 being positioned furthest to the top, an apex 15 being positioned furthest to the left, an apex 16 being positioned furthest below, and an apex 17 being positioned furthest to the right. The upper apex 14 is positioned to the right from the lateral center of the base 10, and the lower apex 16 is positioned to the left from the lateral center of the base 10. Interior angles of the upper and lower apexes 14, 16 are acute, interior angles of the left and right apexes 15, 17 are obtuse, and the left and right apexes 15, 17 are fitted in a rounded manner.

This cam 13 can be divided into an angled left convex cam section 8 convex to the left and an angled right convex cam section 9 convex to the right. The upper ends of the left convex cam section 8 and the right convex cam section 9 connect so as to form the apex 14, and the lower ends of the left convex cam section 8 and the right convex cam section 9 connect so as to form the apex 16. The left convex cam section 8 has a cam surface 18 between the apex 14 and the apex 15 and a cam surface 19 between the apex 15 and the apex 16. The cam surface 18 is inclined downwards to the left from above, and the cam surface 19 is inclined downwards to the right from the lower left of the cam surface 18. The right convex cam section 9 has a cam surface 20 between the apex 16 and the apex 17 and a cam surface 21 between the apex 17 and the apex 14. The cam surface 20 is inclined upwards to the right from the lower right of the cam surface 19, and a cam surface 21 is inclined upwards to the left from the upper right of the cam surface 20 as far as the upper right of the cam surface 18. The position of the apex 15 in the vertical direction is closer to the apex 14 than to the apex 16, and the position of the apex 17 in the vertical direction is closer to the apex 16 than to the apex 14. The length of the cam surface 18 is therefore shorter than the length of the cam surface 19, and the length of the cam surface 20 is shorter than the length of the cam surface 21.

Figure 5:
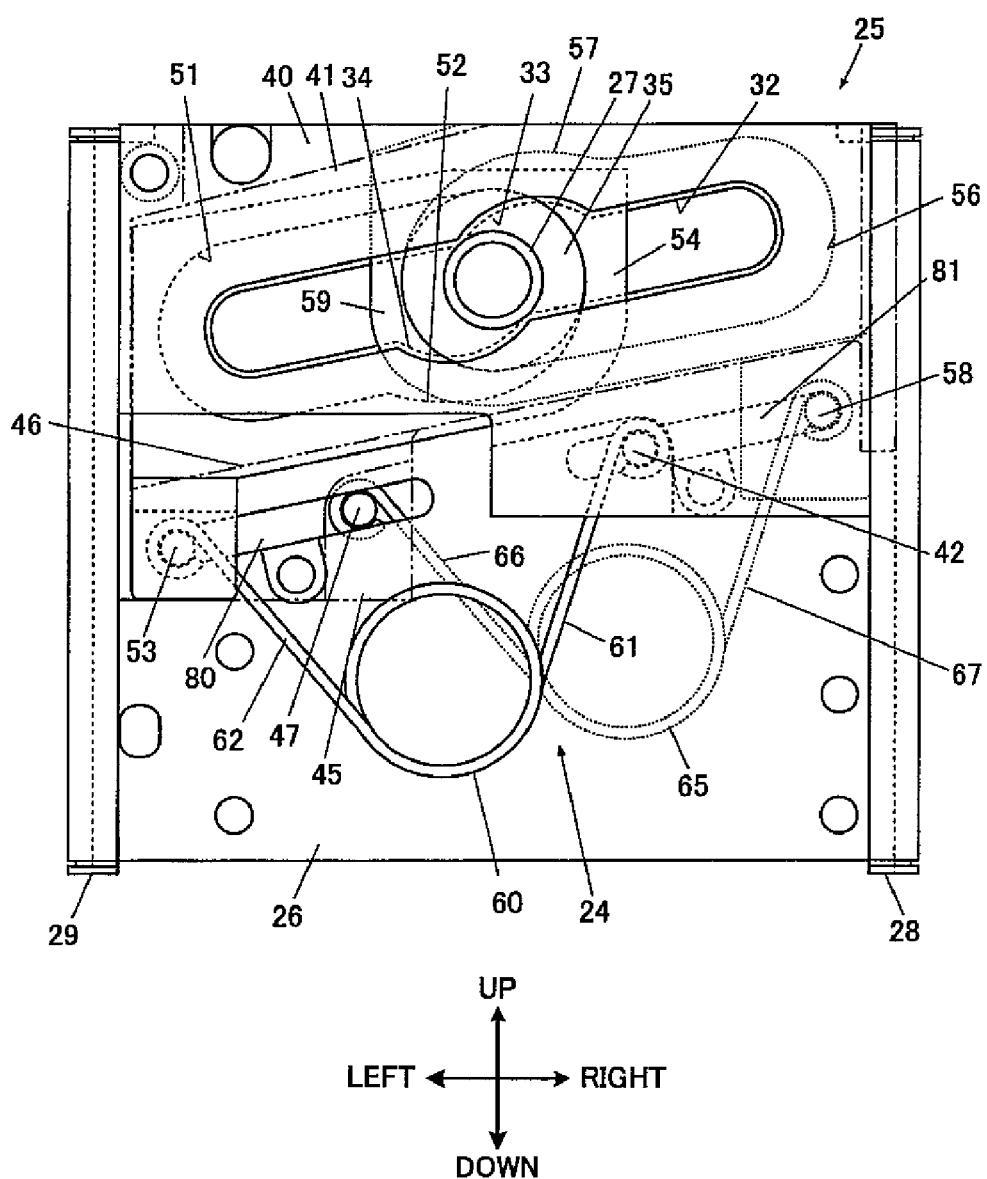
FIG. 5 is a front view of a carriage unit of the slide device.
Figure 6:
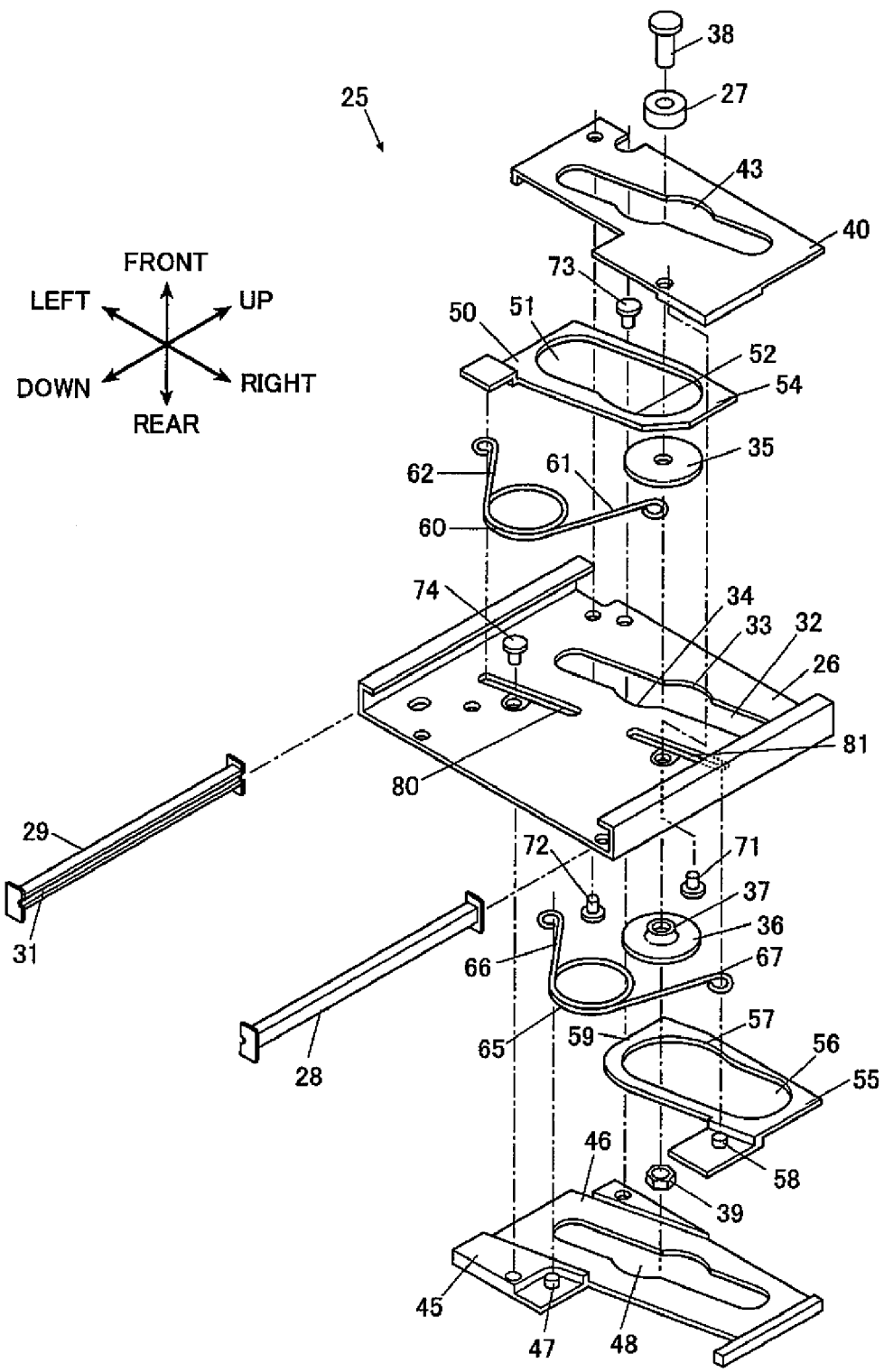
FIG. 6 is an exploded perspective view of the carriage unit.
Figure 7:
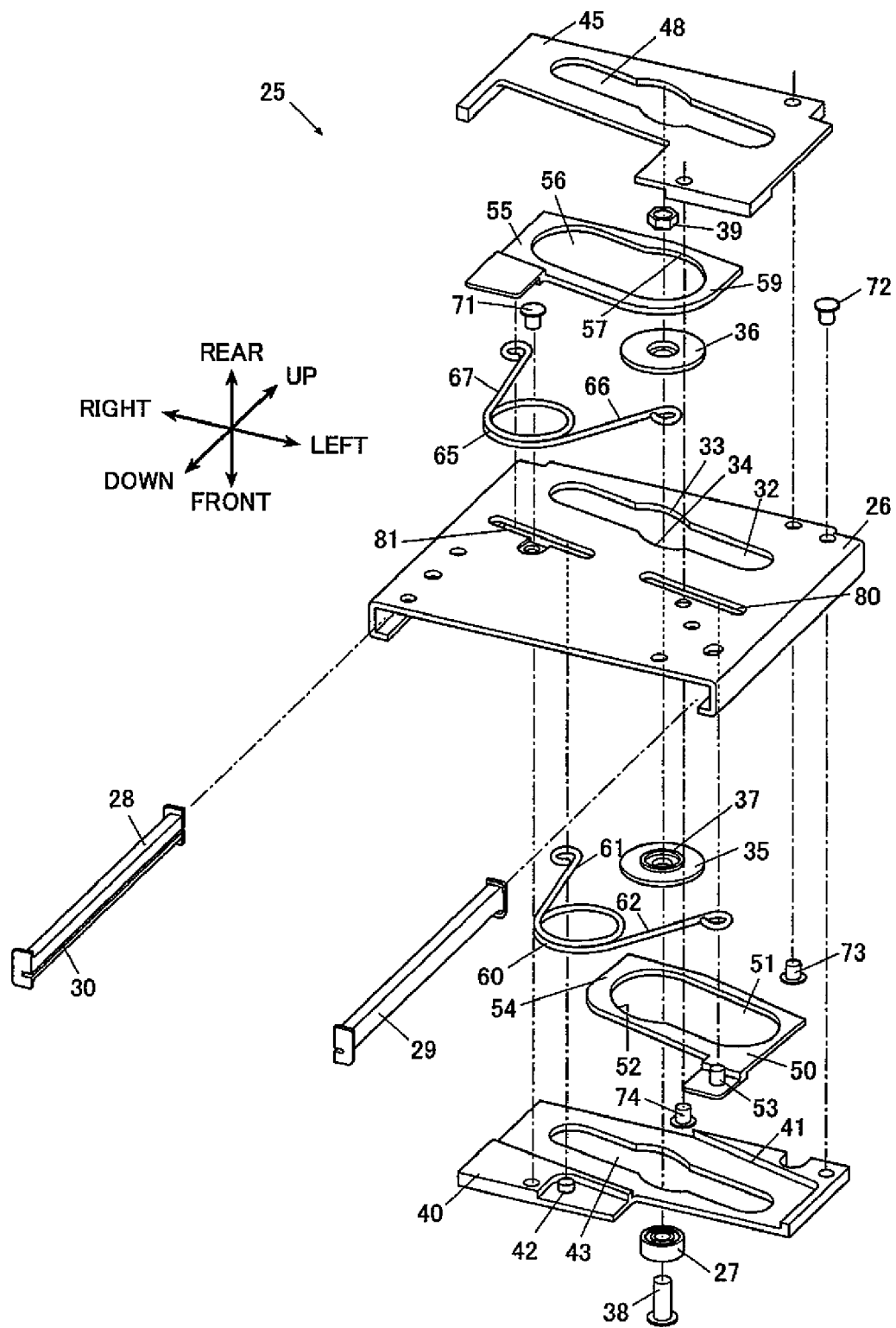
FIG. 7 is a further exploded perspective view of the carriage unit.

A detailed explanation is given for the carriage unit 25 using FIG. 2 and FIGS. 5 to 7. FIG. 5 is a front view of the carriage unit 25, FIG. 6 is an exploded perspective view showing the front surface, the lower surface, and the right side surface of the carriage unit 25 in a disassembled state, and FIG. 7 is an exploded perspective view showing the rear surface, lower surface, and the left side surface of the carriage unit 25 in a disassembled state.

The carriage unit 25 includes a slider 26 fitted to the base 10 so as to be capable of sliding vertically with respect to the base 10, a cam follower 27 circumscribing the cam 13 provided at the slider 26 so as to be capable of moving laterally with respect to the slider 26, and an urging mechanism 24 urging the cam follower 27 laterally towards a central section between the left and right apexes 15 and 17 of the cam 13 so that the cam follower 27 presses against the cam 13.

The slider 26 is formed in the shape of a thin plate. Sliding jigs 28 and 29 are provided to the left and right of the slider 26. Slits 30 and 31 that are long in the vertical direction are formed at the sliding jigs 28 and 29, respectively. The guide rail 11 is inserted into the slit 30 and the guide rail 12 is inserted into the slit 31. The sliding jigs 28 and 29 are capable of sliding along the guide rails 11 and 12, and the slider 26 is capable of sliding vertically with respect to the base 10 as a result. The sliding jigs 28 and 29 are made of resin and have high lubricity with respect to the metal guide rails 11 and 12.

The range with which the slider 26 slides with respect to the base 10 is designed to be a range from a position (hereinafter referred to as "uppermost position") where the upper end of the slider 26 and the upper end of the base 10 meet as shown in FIG. 2 to a position (hereinafter referred to as "lowermost position") where the lower end of the slider 26 and the lower end of the base 10 meet as shown in FIG. 5.

As shown in FIG. 1, the slider 26 is fitted to the other side of the input unit 7 at the front surface of the rear casing 4. When the slider 26 is at the uppermost position, the vertical positions of the upper end of the front casing 3 and the upper end of the rear casing 4 meet, and the vertical positions of the lower end of the front casing 3 and the lower end of the rear casing 4 also meet. The input unit 7 is therefore concealed to the rear of the front casing 3. On the other hand, when the slider 26 is at the lowermost position, the lower end of the rear casing 4 is offset to below from the lower end of the front casing 3 and the input unit 7 is exposed.

As shown in FIG. 2 and FIGS. 5 to 7, a guide 32 that laterally guides the cam follower 27 is formed at the slider 26. The guide 32 passes through the slider 26 from front to rear. The guide 32 is a laterally long hole that is inclined upwards and to the right. The longitudinal direction of the guide 32 is therefore vertical with respect to the cam surfaces 19 and 21 when viewed from the front.

A recess 33 hollowed upwards is formed slightly to the right side from the lateral central section at an upper side edge of the guide 32. A recess 34 hollowed downwards is formed slightly to the left side from the lateral central section at a lower side edge of the guide 32. The positions in the lateral direction of the apex 14 of the cam 13 and the recess 33 coincide, and the positions in the lateral direction of the apex 16 of the cam 13 and the recess 34 also coincide.

The cam follower 27 is a radial ball bearing type roller cam follower. The cam follower 27 is assembled integrally with a front section flange 35, a rear section flange 36, and a sliding neck section 37 formed at the front surface side of the rear section flange 36 using a screw 38 and a nut 39. The front section flange 35 and the rear section flange 36 sandwich the slider 26 and also the sliding neck section 37 by arrangement within the guide 32 of the slider 26. The cam follower 27 is also assembled at a central section at the front surface of the front section flange 35. The diameter of the sliding neck section 37 is substantially the same as the width of the guide 32 (excluding the portions for the recesses 33 and 34). The sliding neck section 37 is therefore capable of sliding along the guide 32. As a result, the cam follower 27, the front section flange 35, the rear section flange 36, and the sliding neck section 37 are formed integrally and are guided along the guide 32. The cam surfaces 19 and 21 in the direction of movement of the cam follower 27 with respect to the slider 26 are therefore perpendicular. The range of lateral movement of the cam follower 27 is designed so as to be from a position corresponding to the left apex 15 of the cam 13 to a position corresponding to the right apex 17.

Next, a detailed explanation is given of the urging mechanism 24.

The urging mechanism 24 includes a front guide member 40 fixed to the front surface of the slider 26, a rear guide member 45 fixed to the rear surface of the slider 26, a first guide plate 50 laterally guided along the guide 32 by the front guide member 40 and laterally guiding the front section flange 35, a second guide plate 55 laterally guided along the guide 32 by the rear guide member 45 and laterally guiding the rear section flange 36, a first torsion spring 60 urging the first guide plate 50 to the left with respect to the slider 26 and the front guide member 40, and a second torsion spring 65 urging the second guide plate 55 to the right with respect to the slider 26 and the rear guide member 45, etc.

A guide recess 41 is formed at the rear surface of the front guide member 40 and a long hole 43 is formed at the bottom of the guide recess 41. A fulcrum pin 42 is also provided protrusively at the rear surface of the front guide member 40. The front guide member 40 is fitted to the slider 26 by screws 71 and 72 in a state where the rear surface of the front guide member 40 comes into contact with the front surface of the slider 26.

A guide recess 46 is formed at the front surface of the rear guide member 45 and a long hole 48 is formed at the bottom of the guide recess 46. A fulcrum pin 47 is also provided protrusively at the rear surface of the rear guide member 45. The rear guide member 45 is fitted to the slider 26 by screws 73 and 74 so that the front surface of the rear guide member 45 comes into contact with the rear surface of the slider 26.

A slidable pin 53 is provided protrusively at the lower left of the rear surface of the first guide plate 50. A guide hole 51 that is laterally long is formed at the first guide plate 50 and a recess 52 hollowed to the lower side is formed at the right side of the lower side edge of the guide hole 51. A right edge portion of the guide hole 51 constitutes a restricting section 54. The first guide plate 50 is provided with some play at the guide recess 41 of the front guide member 40 and is laterally guided by the guide recess 41. On the other hand, at the left section of the slider 26, a laterally long guide slit 80 inclined upwards to the right is formed. The slidable pin 53 of the first guide plate 50 is inserted into the guide slit 80 so as to be capable of sliding along the guide slit 80. The first guide plate 50 is fitted into the guide recess 41 so as to have some play. The first guide plate 50 can therefore rotate slightly around the slidable pin 53.

The front section flange 35 is fitted into the guide hole 51 of the first guide plate 50. The diameter of the front section flange 35 is substantially the same as the width of the guide hole 51 (excluding the portion for the recess 52). The front section flange 35 is therefore guided along the guide hole 51. When the front section flange 35 is positioned at the right end of the guide hole 51, movement of the cam follower 27, the front section flange 35, and the rear section flange 36 further to the right with respect to the first guide plate 50 is restricted as a result of the front section flange 35 abutting with the restricting section 54.

On the other hand, a slidable pin 58 is provided protrusively at the lower right of the front surface of the second guide plate 55. Further, a laterally long guide hole 56 is formed at the second guide plate 55, and a recess 57 hollowed out to the upper side is formed at the left side at the upper side edge of the guide hole 56. A left edge portion of the guide hole 56 constitutes a restricting section 59. The second guide plate 55 is provided with some play at the guide recess 46 of the rear guide member 45 and is laterally guided by the guide recess 46. On the other hand, at the right section of the slider 26, a laterally long guide slit 81 inclined upwards to the right is formed. The slidable pin 58 of the second guide plate 55 is inserted into the guide slit 81 so as to be capable of sliding along the guide slit 81. The second guide plate 55 is fitted into the guide recess 46 so as to have some play. The second guide plate 55 can therefore rotate slightly around the slidable pin 58.

The rear section flange 36 is fitted into the guide hole 56 of the second guide plate 55. The diameter of the rear section flange 36 is substantially equal to the width of the guide hole 56 (excluding the portion for the recess 57). The rear section flange 36 is therefore laterally guided along the guide hole 56. When the rear section flange 36 is positioned at the left end of the guide hole 56, movement of the cam follower 27, the front section flange 35, and the rear section flange 36 further to the left with respect to the second guide plate 55 is restricted as a result of the rear section flange 36 abutting with the restricting section 59.

The tip of one arm 61 of the first torsion spring 60 is rotatably coupled to the fulcrum pin 42, and the tip of the other arm 62 is rotatably coupled to the slidable pin 53. The tip of one arm 66 of the second torsion spring 65 is rotatably coupled to the fulcrum pin 47, and the tip of the other arm 67 is rotatably coupled to the slidable pin 58.

The first guide plate 50 is therefore urged to the left with respect to the slider 26 and the front guide member 40 by the first torsion spring 60. Further, the second guide plate 55 is urged to the right with respect to the slider 26 and the rear guide member 45 by the second torsion spring 65. It is also possible to use a compressing spring, an extending spring, or another spring in place of the first torsion spring 60 and/or the second torsion spring 65.

When the cam follower 27, the front section flange 35, and the rear section flange 36 are positioned at the lateral central section of the guide 32, the front section flange 35 fitted into the guide hole 51 abuts with the restricting section 54 of the right edge portion of the guide hole 51, and the rear section flange 36 fitted into the guide hole 56 abuts with the restricting section 59 of the left edge portion of the guide hole 56. In this state, the force of the torsion springs 60, 65 acting on the cam follower 27, the front section flange 35, and the rear section flange 36 are in balance. In a state where the second guide plate 55, the cam follower 27, the front section flange 35, and the rear section flange 36 resist the second torsion spring 65 so as to be to the left side from the lateral central section, the front section flange 35 comes away to the left from the restricting section 54 along the guide hole 51. The load due to the first torsion spring 60 therefore does not act on the cam follower 27, the front section flange 35, and the rear section flange 36. On the other hand, in a state where the first guide plate 50, the cam follower 27, the front section flange 35, and the rear section flange 36 resist the first torsion spring 60 so as to be to the right side from the lateral central section, the rear section flange 36 comes away to the right from the restricting section 59 along the guide hole 56. The load due to the second torsion spring 65 therefore does not act on the cam follower 27, the front section flange 35, and the rear section flange 36.

The cam follower 27 is fitted so as to have play with respect to the long hole 43 of the front guide member 40 and therefore does not make contact with the front guide member 40. The cam follower 27 projects forwards from the front surface of the front guide member 40. This projecting portion therefore circumscribes the cam 13 in a state where the slider 26 is assembled to the base 10. The nut 39 is therefore fitted with play with respect to the long hole 48 so as not to make contact with the rear guide member 45. The rear guide member 45 therefore does not interfere with movement of the cam follower 27.

As shown in FIG. 2, when the slider 26 is in the uppermost position, the cam follower 27 comes into contact with the cam surface 18 in the vicinity of the apex 14 of the cam 13. When the force of both of the torsion springs 60 and 65 are in equilibrium in this state, the cam follower 27 is positioned at the laterally central section. The state of FIG. 2 can then be maintained by having the apex 14 more to the right side than the equilibrium position of the cam follower 27.

Figure 8:
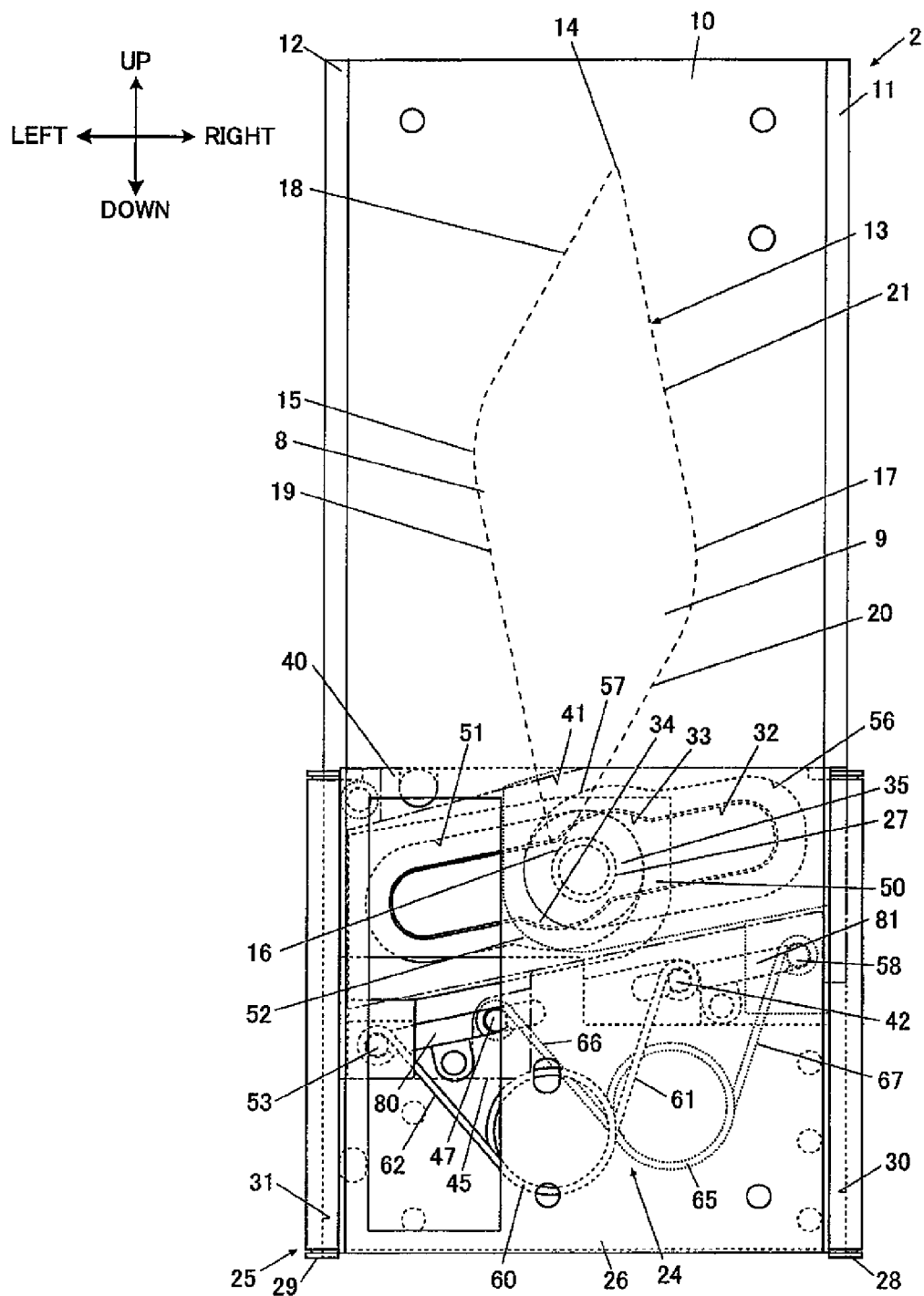
FIG. 8 is a front view of the slide device.

As shown in FIG. 8, when the slider 26 is in the lowermost position, the cam follower 27 comes into contact with the cam surface 20 in the vicinity of the apex 16 of the cam 13. When the force of both of the torsion springs 60 and 65 are in equilibrium in this state, the cam follower 27 is positioned at the laterally central section. The state of FIG. 8 can then be maintained by having the apex 16 more to the left side than the equilibrium position of the cam follower 27.

When the forces of both of the torsion springs 60 and 65 are in equilibrium as shown in FIGS. 2 and 8 so that the cam follower 27 is positioned at the laterally central section, the front section flange 35 abuts with the right edge of the guide hole 51 and the rear section flange 36 abuts with the left edge of the guide hole 56.

The following is an explanation of operation of the slide device 2 due to operation of the electronic equipment 1. (When the Slider 26 is Slid to the Uppermost Position from the Lowermost Position)

The user slides the front casing 3 downwards with respect to the rear casing 4 with the slider 26 in the lowermost position (refer to FIG. 8). In doing so, the slider 26 slides upwards with respect to the base 10 and the cam follower 27 also moves upwards together with the slider 26. In accompaniment with this, the cam follower 27 slides on the cam surface 20 while being pushed to the right by the cam surface 20. This means that the cam follower 27, the front section flange 35, and the rear section flange 36 move to the right along the guide 32. At this time, the rear section flange 36 comes away from the restricting section 59 of the second guide plate 55 and moves to the right along the guide hole 56. The second guide plate 55 therefore does not move. On the other hand, the front section flange 35 moves to the right while pushing the restricting section 54 of the first guide plate 50. The first guide plate 50 therefore resists the urging force of the first torsion spring 60 and moves to the right. This means that the first torsion spring 60 is wound up and that the angle of deflection becomes large. When the user releases the front casing 3 with the cam follower 27 in contact with the cam surface 20, the slider 26 moves downwards as a result of the urging force of the first torsion spring 60 and the state of FIG. 8 is returned to.

Figure 9:
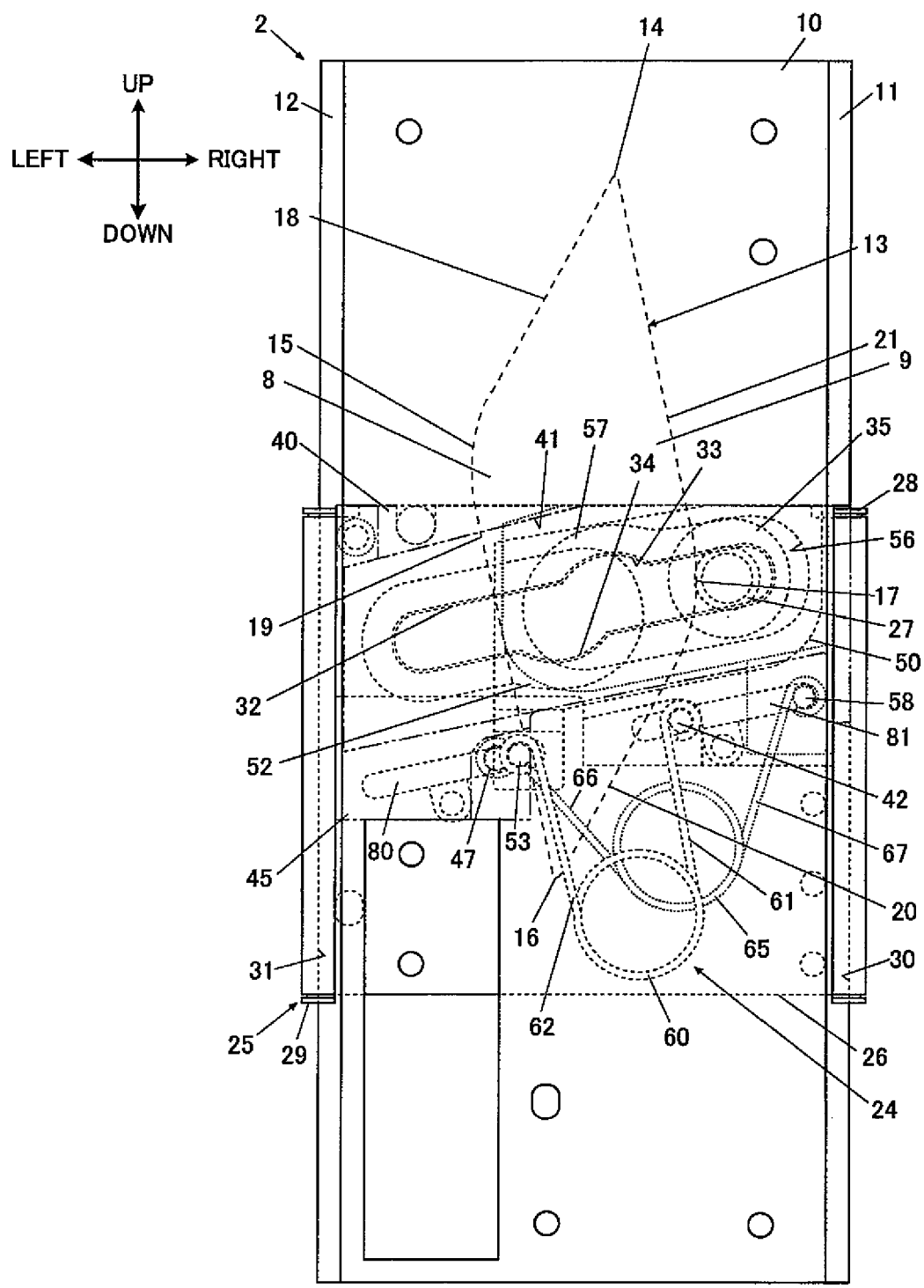
FIG. 9 is a further front view of the slide device.

When the user then slides the front casing 3 downwards with respect to the rear casing 4, as shown in FIG. 9, the cam follower 27 reaches the apex 17 of the cam 13 and comes into contact with the cam surface 21. In doing so, the urging force of the first torsion spring 60 acts on the cam surface 21 from the cam follower 27 and the cam follower 27 is therefore subjected to the reactive force of the cam surface 21. This means that the slider 26 automatically slides upwards with respect to the base 10 as a result of the urging force of the first torsion spring 60 even if the user does not apply a substantial load and the front casing 3 therefore automatically slides downwards with respect to the rear casing 4.

Figure 10:
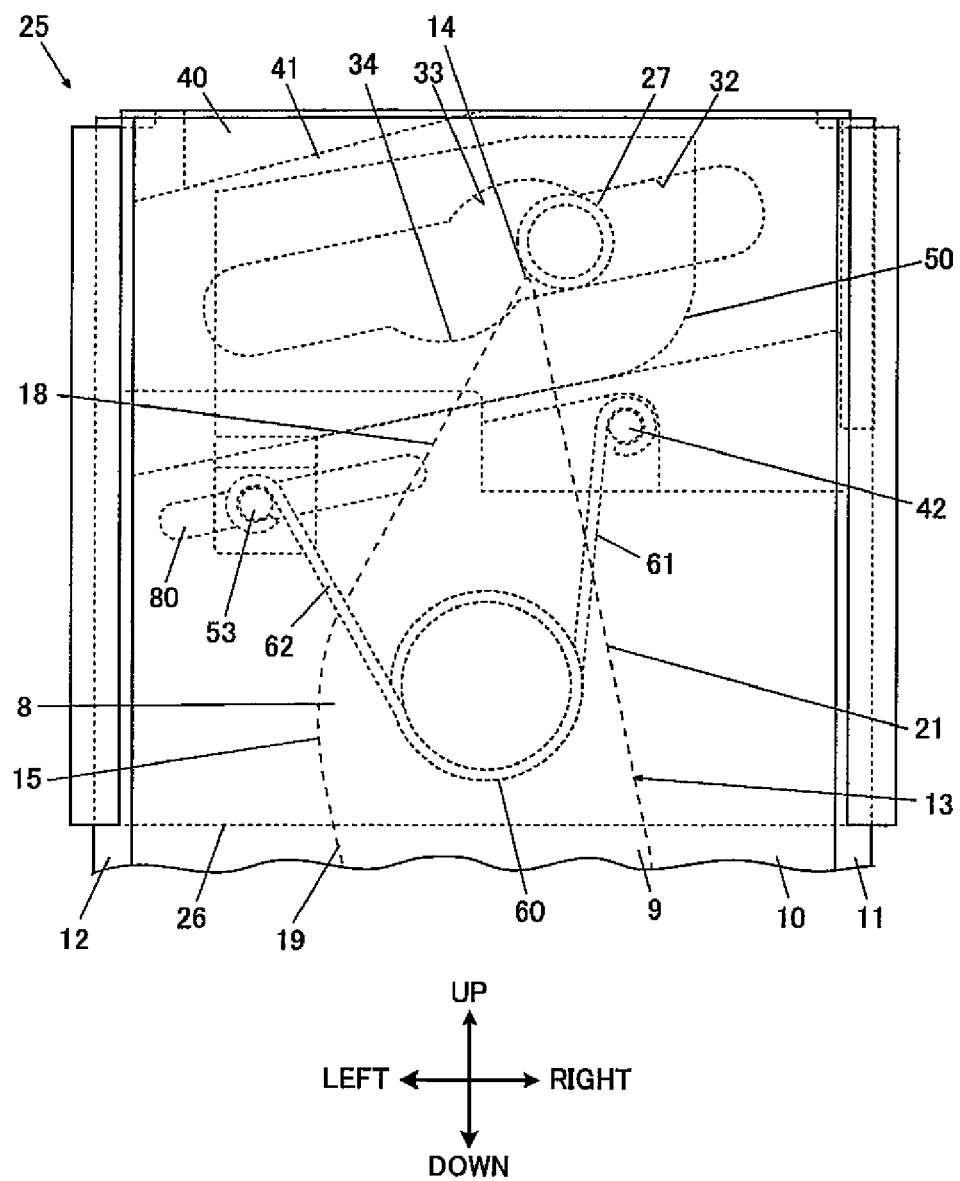
FIG. 10 is an outline front view of an upper part of the slide device.
Figure 11:
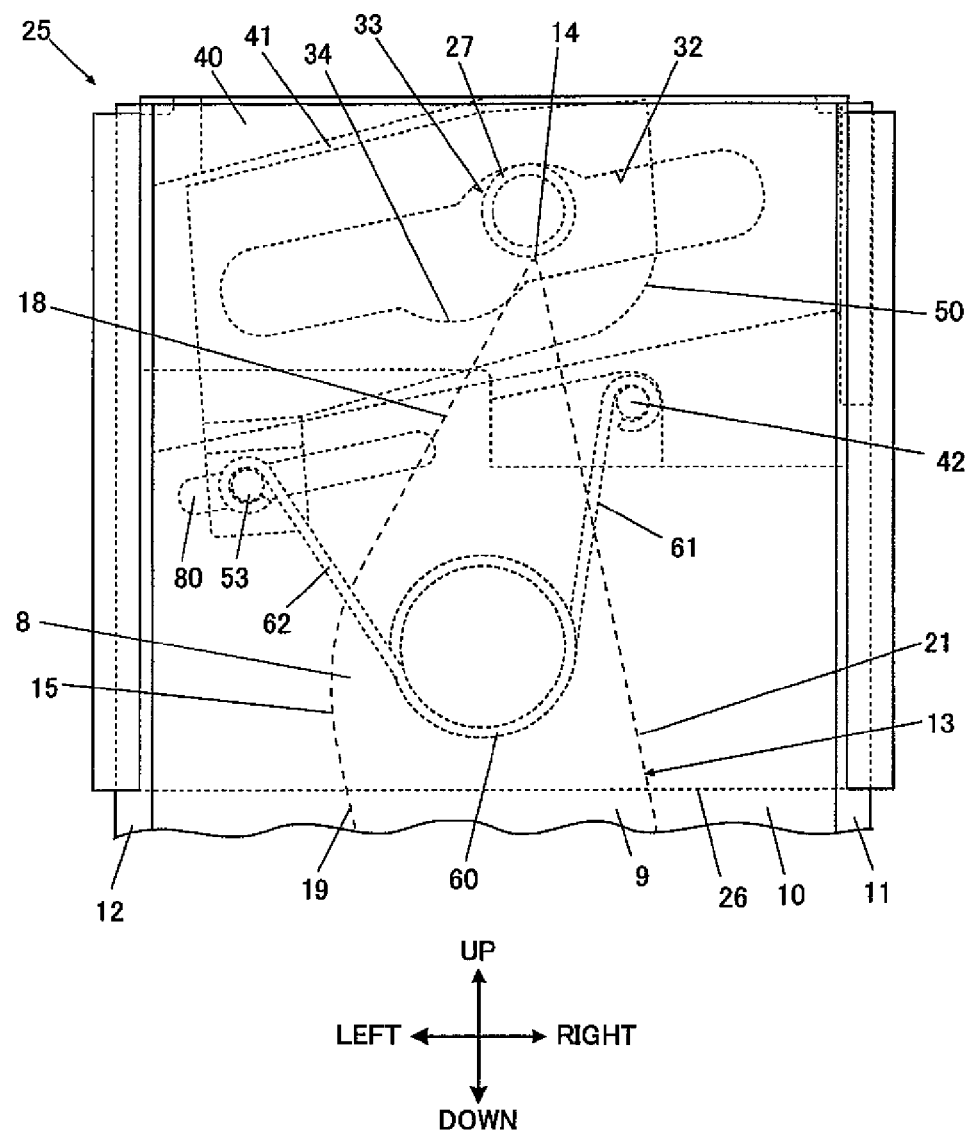
FIG. 11 is a further outline front view of the upper part of the slide device.
Figure 12:
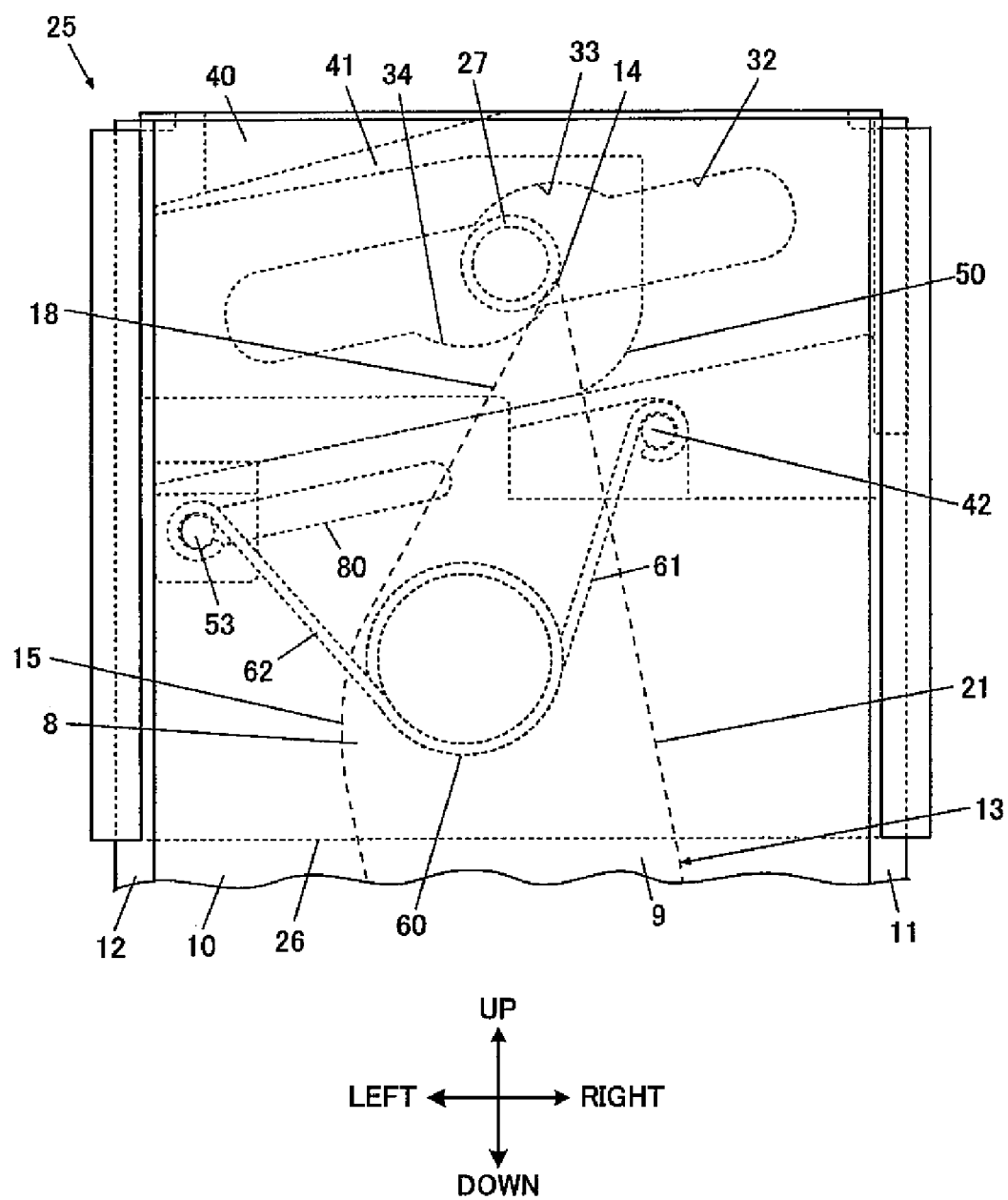
FIG. 12 is another outline front view of the upper part of the slide device.

When the user then slides the front casing 3 downwards with respect to the rear casing 4, the slider 26 reaches the uppermost position and the positions in the vertical directions of the upper end of the front casing 3 and the upper end of the rear casing 4 meet. While the slider 26 reaches the uppermost position, as shown in FIGS. 10 to 12, the cam follower 27 travels over the apex 14 from the cam surface 21 to the cam surface 18. Specifically, as shown in FIG. 10, immediately before the cam follower 27 reaches the apex 14, the first guide plate 50 and the cam follower 27 etc. are urged to the left by the first torsion spring 60. The cam follower 27 therefore travels over the apex 14. As shown in FIG. 11, when the cam follower 27 travels over the apex 14, the sliding neck section 37 of the cam follower 27 escapes to the recess 33 of the slider 26, the rear section flange 36 escapes to the recess 57 of the second guide plate 55, and the first guide plate 50 tilts to the left around the slidable pin 53. When the cam follower 27 then travels over the apex 14, as shown in FIGS. 2 and 12, the forces due to the torsion springs 60 and 65 are in equilibrium and the cam follower 27 is positioned at the lateral central section. This means that the apex 14 is more to the right side than the position of equilibrium of the cam follower 27. The cam follower 27 therefore automatically travels over the apex 14 while the slider 26 reaches the uppermost position. In particular, the cam follower 27 can easily travel over the apex 14 from the cam surface 21 becoming perpendicular with respect to the longitudinal direction of the guide 32 of the slider 26. While the cam follower 27 is traveling over the apex 14, the cam follower 27 escapes to the recesses 33 and 57 so as to shift slightly upwards with respect to the guide 32 of the slider 26. The slider 26 itself therefore does not shift upwards with respect to the base 10. The front casing 3 therefore does not rattle vertically with respect to the rear casing 4 while the cam follower 27 is traveling over the apex 14.

(When the Slider 26 is Slid from the Uppermost Position to the Lowermost Position)

The user slides the front casing 3 upwards with respect to the rear casing 4 with the slider 26 in the uppermost position (refer to FIG. 2). In doing so, the slider 26 slides downwards with respect to the base 10 and the cam follower 27 also moves downwards together with the slider 26. In accompaniment with this, the cam follower 27 slides on the cam surface 18 while being pushed to the left by the cam surface 18. This means that the cam follower 27, the front section flange 35, and the rear section flange 36 move to the left along the guide 32. At this time, the front section flange 35 comes away from the restricting section 54 of the first guide plate 50 so as to move to the left along the guide hole 51. The first guide plate 50 therefore does not move. On the other hand, the rear section flange 36 moves to the left while pressing the restricting section 59 of the second guide plate 55. The second guide plate 55 therefore moves to the left in resistance to the urging force of the second torsion spring 65. This means that the second torsion spring 65 is wound up and that the angle of deflection becomes large. When the user releases the front casing 3 with the cam follower 27 in contact with the cam surface 18, the slider 26 moves upwards as a result of the urging force of the second torsion spring 65 and the state of FIG. 2 is returned to.

Figure 13:
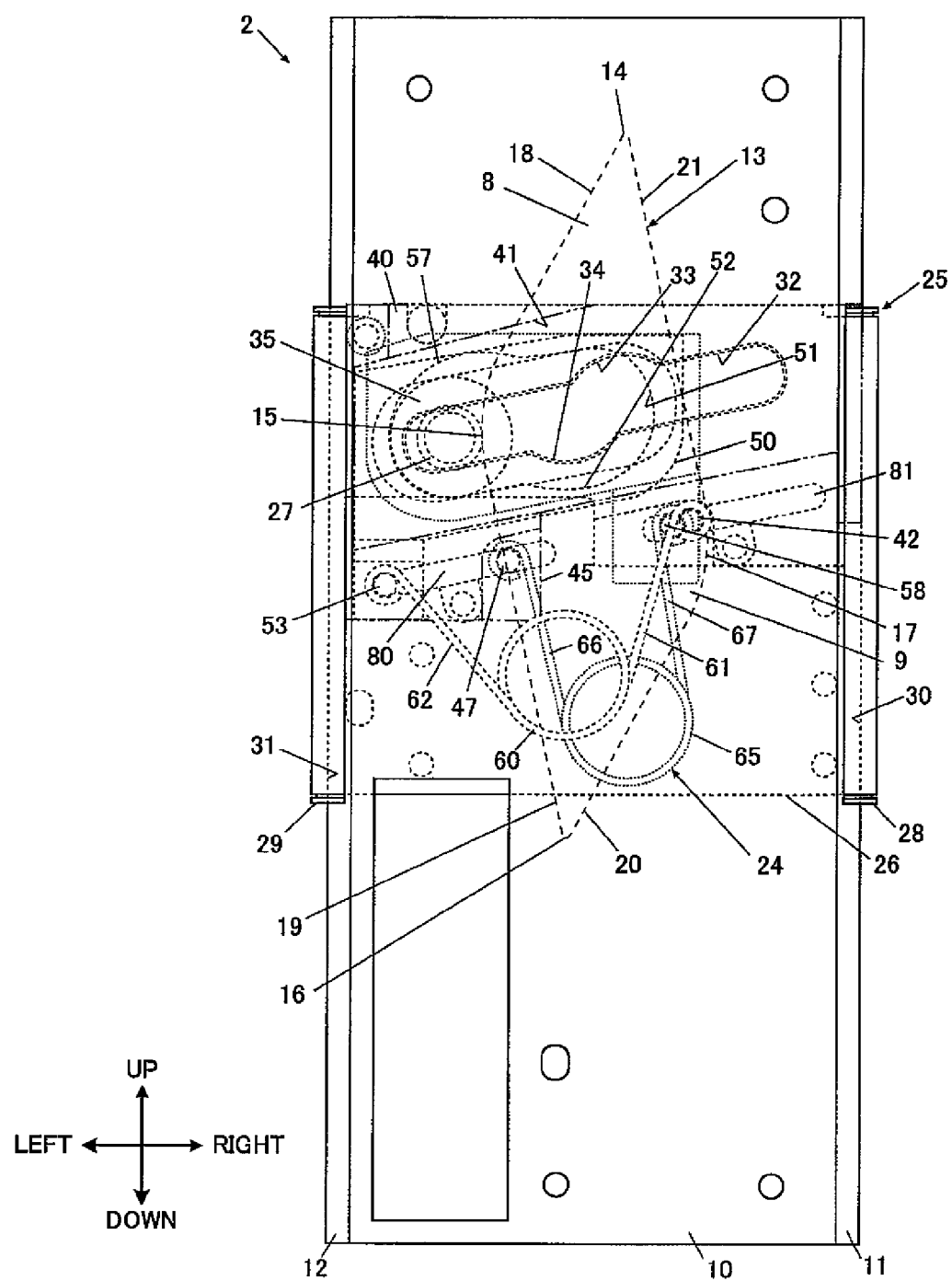
FIG. 13 is a front view of the slide device.

When the user then slides the front casing 3 upwards with respect to the rear casing 4, as shown in FIG. 13, the cam follower 27 reaches the apex 15 of the cam 13 and comes into contact with the cam surface 19. In doing so, the urging force of the second torsion spring 65 acts on the cam surface 19 from the cam follower 27 and the cam follower 27 is therefore subjected to the reactive force of the cam surface 19. This means that the slider 26 automatically slides downwards with respect to the base 10 as a result of the urging force of the second torsion spring 65 even if the user does not apply a substantial load and the front casing 3 therefore automatically slides upwards with respect to the rear casing 4.

When the user then slides the front casing 3 upwards with respect to the rear casing 4, the slider 26 reaches the lowermost position, and the whole of the input unit 7 provided at the front surface of the rear casing 4 is exposed. During this time, right before the cam follower 27 reaches the apex 16, the second guide plate 55 and the cam follower 27 etc. are urged to the right by the second torsion spring 65. The cam follower 27 therefore travels over the apex 16. When the cam follower 27 then travels over the apex 16, the sliding neck section 37 of the cam follower 27 escapes to the recess 34 of the slider 26 and the front section flange 35 escapes to the recess 52 of the first guide plate 50. The second guide plate 55 then tilts to the right around the slidable pin 58. When the cam follower 27 then travels over the apex 16, as shown in FIG. 8, the forces due to the torsion springs 60 and 65 are in equilibrium and the cam follower 27 is positioned at the lateral central section. This means that the apex 16 is more to the left side than the position of equilibrium of the cam follower 27. The cam follower 27 therefore automatically travels over the apex 16 while the slider 26 reaches the lowermost position. In particular, the cam follower 27 can easily travel over the apex 16 from the cam surface 19 becoming perpendicular with respect to the longitudinal direction of the guide 32 of the slider 26. While the cam follower 27 is traveling over the apex 16, the cam follower 27 escapes to the recesses 34 and 52 so as to shift slightly downwards with respect to the guide 32 of the slider 26. The slider 26 itself therefore does not shift downwards with respect to the base 10. The front casing 3 therefore does not rattle vertically with respect to the rear casing 4 while the cam follower 27 is traveling over the apex 16.

In this embodiment, the cam follower 27 is laterally guided by the guide 32 formed at the slider 26 between the positions corresponding to the left and right apexes 15 and 17 of the cam 13 provided at the base 10 so as to circumscribe the cam 13 and be urged towards the laterally central section of the cam 13 by the urging mechanism 24. The cam follower 27 can therefore slide on the cam surfaces 18 and 19 while the slider 26 slides from the uppermost position to the lowermost position. Conversely, the cam follower 27 can also therefore slide on the cam surfaces 20 and 21 while the slider 26 slides from the lowermost position to the uppermost position. Namely, it is possible for the path of the cam follower 27 to change depending on the direction of sliding of the slider 26. In particular, the upper apex 14 is disposed to the right of a position of equilibrium of the cam follower 27 due to the torsion springs 60 and 65 and the lower apex 16 is disposed to the left of this equilibrium position. The cam follower 27 can therefore reliably travel over the apexes 14 and 16 at the uppermost position and the lowermost position. It is therefore possible for the path of the cam follower 27 to reliably change depending on the direction of sliding of the slider 26.

As a result of making the path for the cam follower 27 different depending on the direction of sliding of the slider 26, it is possible to set a distance that the slider 26 slides in resistance to the urging force of the urging mechanism 24 and a distance that the slider 26 slides assisted by the urging force of the urging mechanism 24 independently for each sliding direction. In particular, the length of the cam surface 18 is shorter than the length of the cam surface 19. The distance that the slider 26 slides downwards in resistance to the urging force of the urging mechanism 24 is therefore shorter than the distance that the slider 26 slides downwards assisted by the urging force of the urging mechanism 24. This is also the case when the slider 26 slides upwards because the length of the cam surface 20 is shorter than the length of the cam surface 21. This means that the operation is easy for the user when both closing and opening the electronic equipment 1.

The direction of the guide 32 formed at the slider 26 is not perpendicular with respect to this sliding direction of the slider 26 but rather slanted. This means that the sliding neck section 37 coupled to the cam follower 27 slides smoothly to the left and right within the guide 32 as the slider 26 slides vertically and the cam follower 27 therefore moves smoothly to the left and right. The cam follower 27 is a roller follower and therefore slides smoothly on the cam surfaces 18 to 21. It is therefore possible for the user to open and close electronic equipment 1 at a low load because the cam follower 27 moves smoothly.

The present invention is by no means limited to the above embodiment, and the various design modifications of the above embodiment are included in the scope of the present invention.

For example, the limitations of the vertical direction (y-axis direction), the lateral direction (x-axis direction), and the orthogonal condition set thereto used in the description of the embodiment above are provided merely to facilitate understanding of the present invention and can be arbitrarily changed in order to achieve the object of the present invention.

The shape of the cam 13 also does not have to be a parallelogram. The cam surfaces 18 to 21 can also, for example, be in the shape of a circular arc when viewed from the front. It is, however, preferable for the interior angles of the apexes 14 and 16 to be 90° or less from the point of view of holding the cam follower 27 at the uppermost position and the lowermost position. It is also preferable for the interior angles of the apexes 15 and 17 to be 90° or more from the point of view of the slider 26 sliding smoothly. It is also preferable for the cam surface 18 to be shorter than the cam surface 19, and for the cam surface 20 to be shorter than the cam surface 21 from the point of view of making the distance that the slider 26 slides while assisted by the torsion springs 60 and 65 longer than the distance that the slider 26 slides in resistance to the urging force of the torsion springs 60 and 65.

Figure 14:
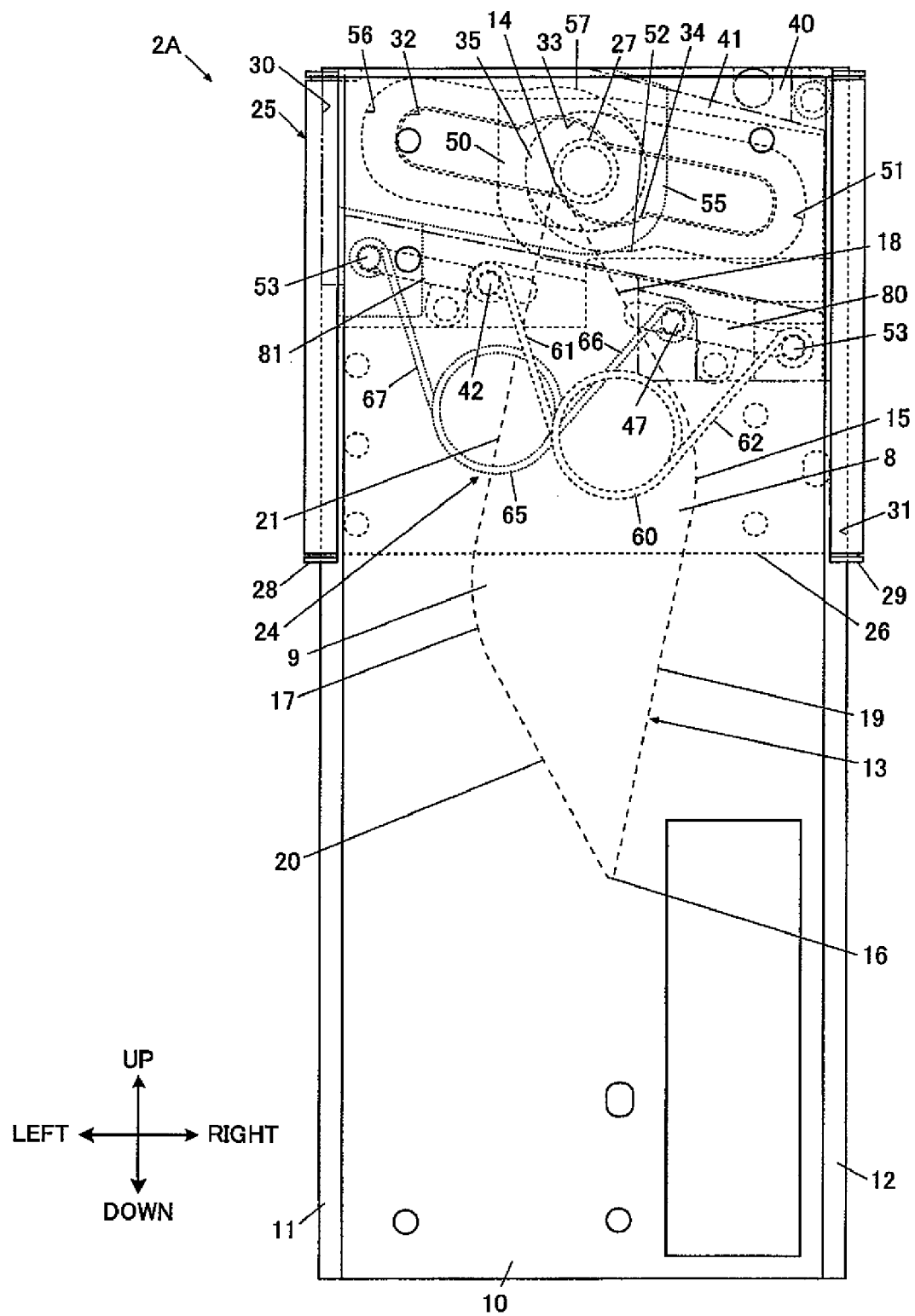
FIG. 14 is a front view of a modified example of the slide device.

As shown in FIG. 14, it is also possible to invert the relationship of left and right with respect to the slide device 2 described using FIG. 2 etc. and adopt a slide device 2A that has a mirror image relationship with respect to the slide device 2. The slide device 2A is the same as the slide device 2 with the exception of being plane-symmetrical with respect to the slide device 2. In FIG. 14 and FIG. 2, corresponding structural elements are given the same numerals and are not described for the slide device 2A. In FIG. 14, the cam section 8 is a right convex cam section and the cam section 9 is a left convex cam section.

The cam 13 can also be a grooved cam rather than a circumscribing cam.

Second Embodiment

Figure 15:
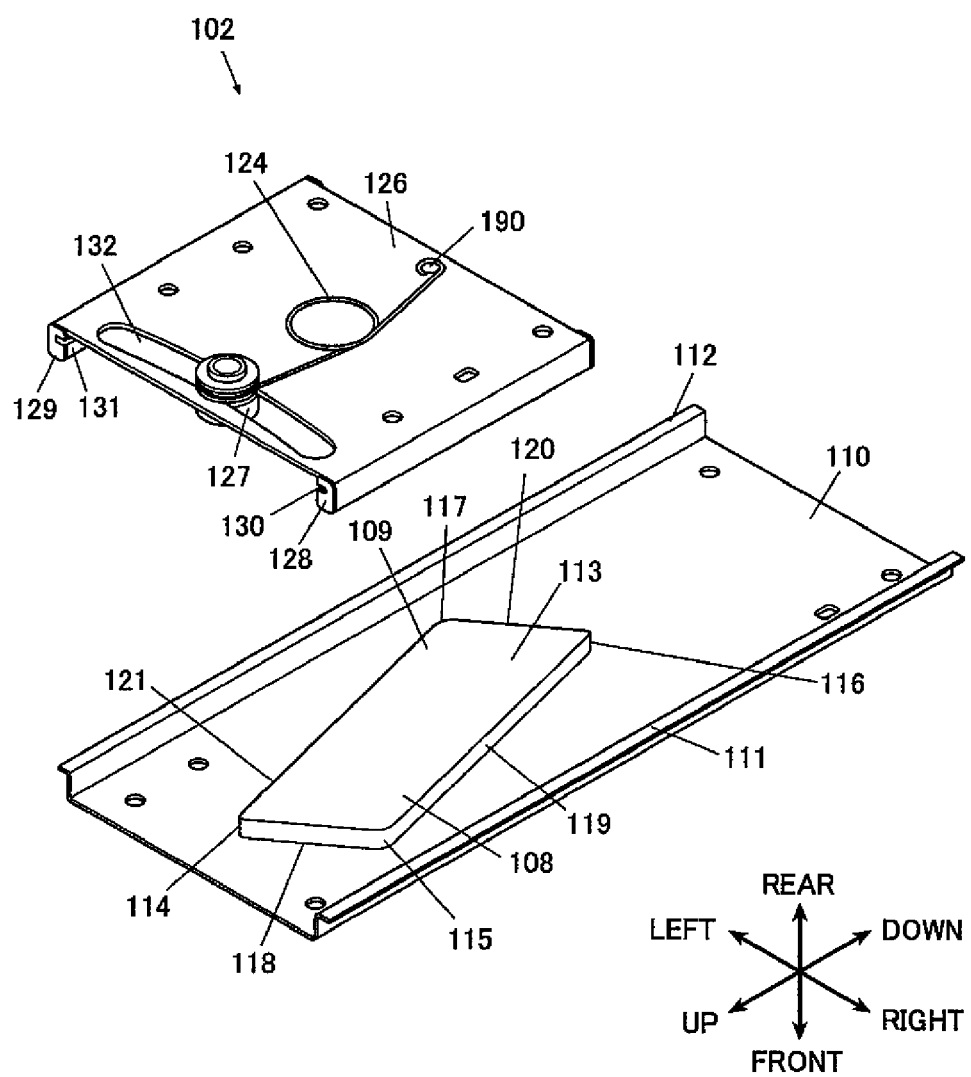
FIG. 15 is a perspective view of a slide device of a second embodiment of the present invention.
Figure 16:
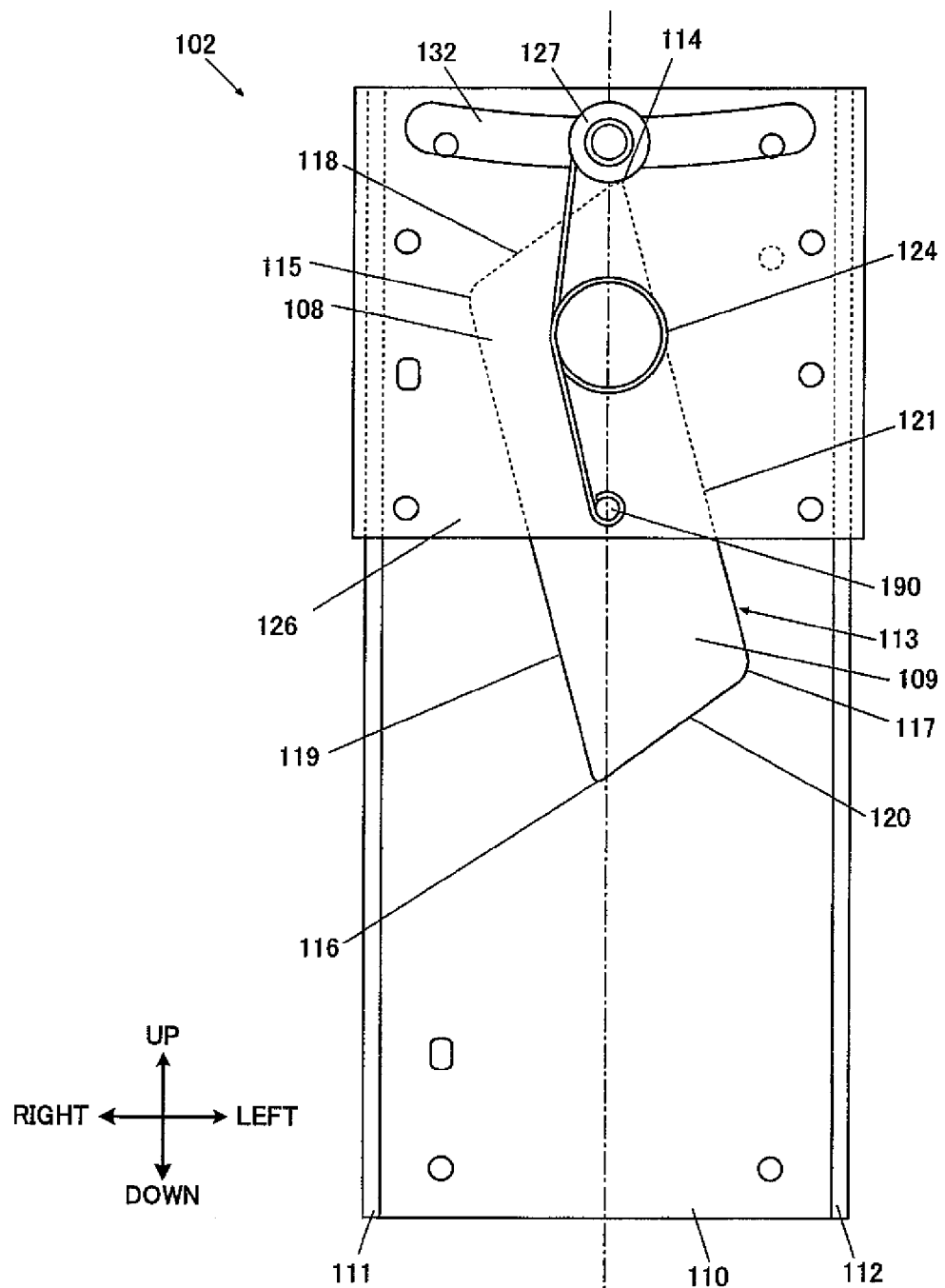
FIG. 16 is a rear view of the slide device.

FIG. 15 is a perspective view of a slide device 102 of a second embodiment of the present invention, and FIG. 16 is a rear view showing the slide device 102. The slide device 102 is assembled in electronic equipment 1 so as to replace the slide device 2.

As shown in FIGS. 15 and 16, this slide device 102 includes a thin plate-shaped base 110, a cam 113 provided at the rear surface of the base 110, a slider 126 fitted to the base 110 so as to be vertically movable with respect to the base 110, a cam follower 127 provided so as to be laterally movable with respect to the slider 126, and an urging spring 124 that laterally urges the cam follower 127 towards the lateral center of the slider 126.

Guide rails 111, 112 are formed in the shape of straight lines in a vertical direction at both the left and right ends of the base 110 as with the base 10 of the first embodiment.

As with the slider 26 of the first embodiment, sliding jigs 128 and 129 are provided to the left and right sides of the slider 126. The guide rail 111 is then inserted into a slit 130 of the sliding jig 128 and the guide rail 112 is inserted into a slit 131 of the sliding jig 129. The slider 126 is therefore capable of sliding vertically with respect to the base 110.

The cam 113 is provided at the lateral central section of the base 110 slightly above a vertical central section of the base 110. The cam 113 is a parallelogram with four apexes 114 to 117 positioned above, to the left, below, and to the right respectively. This cam 113 can be divided into an angled right convex cam section 108 convex to the right and an angled left convex cam section 109 convex to the left. The right convex cam section 108 has a cam surface 118 between the apex 114 and the apex 115 and a cam surface 119 between the apex 115 and the apex 116. The left convex cam section 109 has a cam surface 120 between the apex 116 and the apex 117 and a cam surface 121 between the apex 117 and the apex 114. The cam surface 118 is inclined downwards to the right from the apex 114, the cam surface 119 is inclined downwards to the left from the apex 115, the cam surface 120 is inclined upwards to the left from the apex 116, and the cam surface 121 is inclined upwards to the right from the apex 117. A position of the apex 115 in the vertical direction is closer to the apex 114 than to the apex 116, and a position of the apex 117 in the vertical direction is closer to the apex 116 than to apex 114. This means that the lengths of the cam surfaces 118 and 120 are shorter than the length of the cam surfaces 119 and 121.

A guide 132 is formed at an upper part of the slider 126. The guide 132 is a long hole that is long in a lateral direction and the cam follower 127 is laterally guided by the guide 132. A portion on the right side of the guide 132 is inclined upwards to the right from the lateral center of the slider 126, a portion on the left side of the guide 132 is inclined upwards and to the left from the lateral center of the slider 126, and the guide 132 is bent so as to be convex downwards overall.

At the slide device 102 of the second embodiment, the urging mechanism is constituted by the urging spring 124. One end of the urging spring 124 is coupled to the cam follower 127, and the other end of the urging spring 124 is coupled to a coupling section 190 provided protrusively on the slider 126 at the lateral center of the slider 126 on the lower side from the guide 132. The cam follower 127 is rotatable with respect to one end of the urging spring 124 centrally about its axis, and the other end of the urging spring 124 is rotatable around the coupling section 190 of the slider 126. The urging spring 124 is a torsion spring. The cam follower 127 is pulled towards the coupling section 190 by the urging spring 124. The cam follower 127 is then urged latterly towards the lateral center of the slider 126 as a result of a moment acting on the cam follower 127. The cam follower 127 then circumscribes the cam 113 and presses against the cam 113 because of the urging spring 124. When the cam follower 127 is positioned at the lateral center of the slider 126, the moment is in equilibrium.

The apex 114 above the cam 113 is positioned to the left of the position of equilibrium of the cam follower 127. The lower apex 116 is positioned to the right of the position of equilibrium of the cam follower 127.

The slide device 102 is assembled in electronic equipment 1 so as to replace the slide device 2. Specifically, as with the first embodiment, the base 110 is fitted to the rear surface of the front casing 3, and the slider 126 is fitted to the upper side of the input unit 7 at the front surface of the rear casing 4.

The following is an explanation of operation of the slide device 2 due to operation of the electronic equipment 1.

As shown in FIG. 16, when the upper end of the slider 126 and the upper end of the base 110 meet, the cam follower 127 is positioned at the lateral central section of the guide 132 and comes into contact with the cam surface 118 in the vicinity of the apex 114. In this state, the vertical positions of the upper end of the front casing 3 and the upper end of the rear casing 4 of the electronic equipment 1 meet.

The user then slides the front casing 3 upwards with respect to the rear casing 4. In doing so, the slider 126 slides downwards with respect to the base 110 and the cam follower 127 also moves downwards together with the slider 126. In accompaniment with this, the cam follower 127 resists the urging spring 124 and slides over the cam surface 118 while being pushed to the right by the cam surface 118. When the user releases the front casing 3 with the cam follower 127 in contact with the cam surface 118, the slider 126 is moved upwards by the urging force of the urging spring 124 and the situation of FIG. 16 is returned to.

Figure 17:
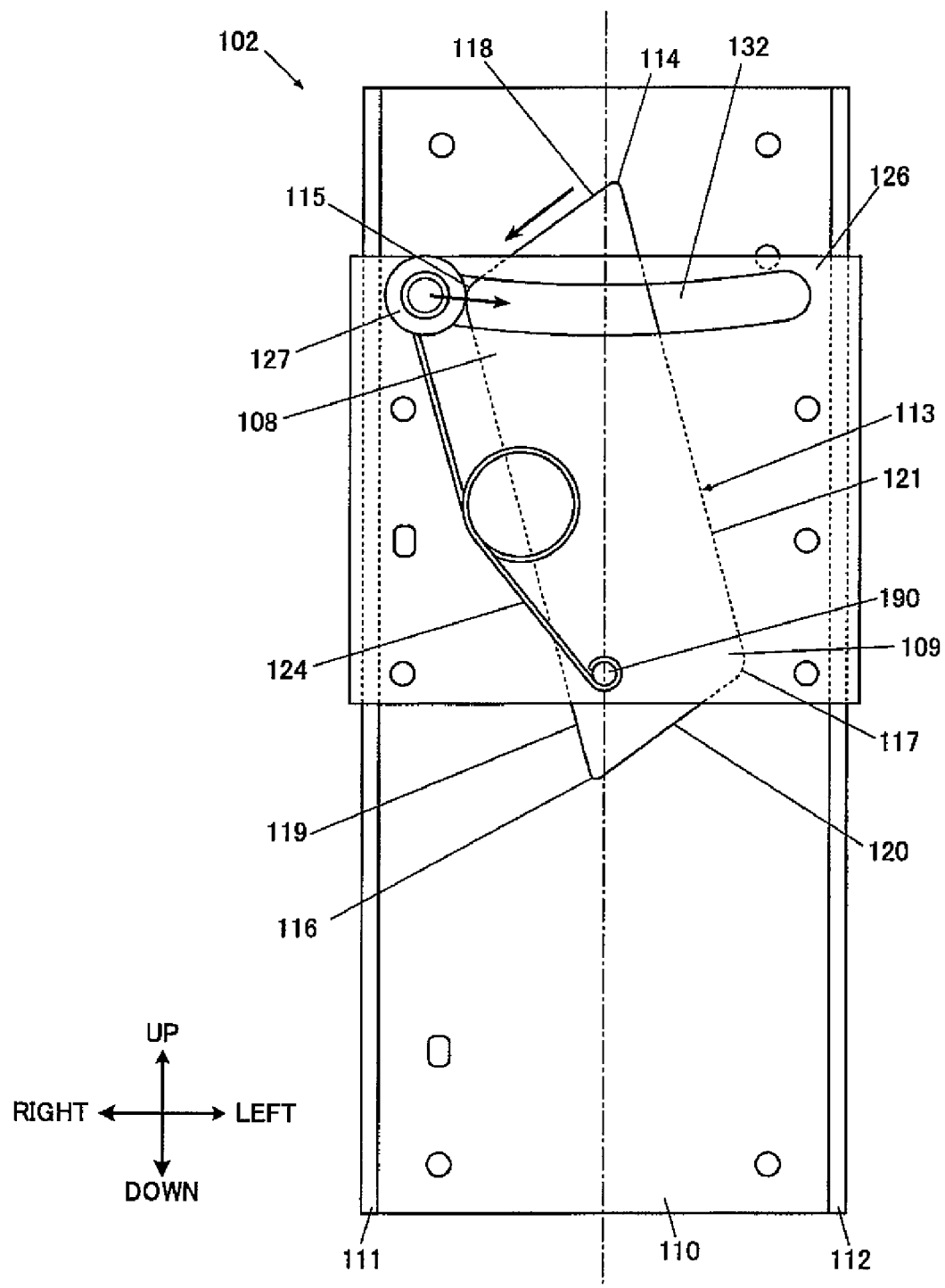
FIG. 17 is a further rear view of the slide device.

When the user then slides the front casing 3 upwards with respect to the rear casing 4, as shown in FIG. 17, the cam follower 127 reaches the apex 115 of the cam 113 and comes into contact with the cam surface 119. In doing so, the cam follower 127 is pushed against the cam surface 119 by the urging spring 124 and the cam follower 127 is therefore subjected to reactive force of the cam surface 119. This means that the slider 126 automatically slides downwards with respect to the base 110 due to the urging spring 124 even if the user does not apply a substantial load and the front casing 3 therefore automatically slides upwards with respect to the rear casing 4.

The user then slides the front casing 3 upwards with respect to the rear casing 4. In doing so, the cam follower 127 is urged towards the center by the urging spring 124 immediately before reaching the apex 116 of the cam 113 and the apex 116 of the cam 113 is traveled over. This then gives the situation shown in FIG. 18.

Figure 18:
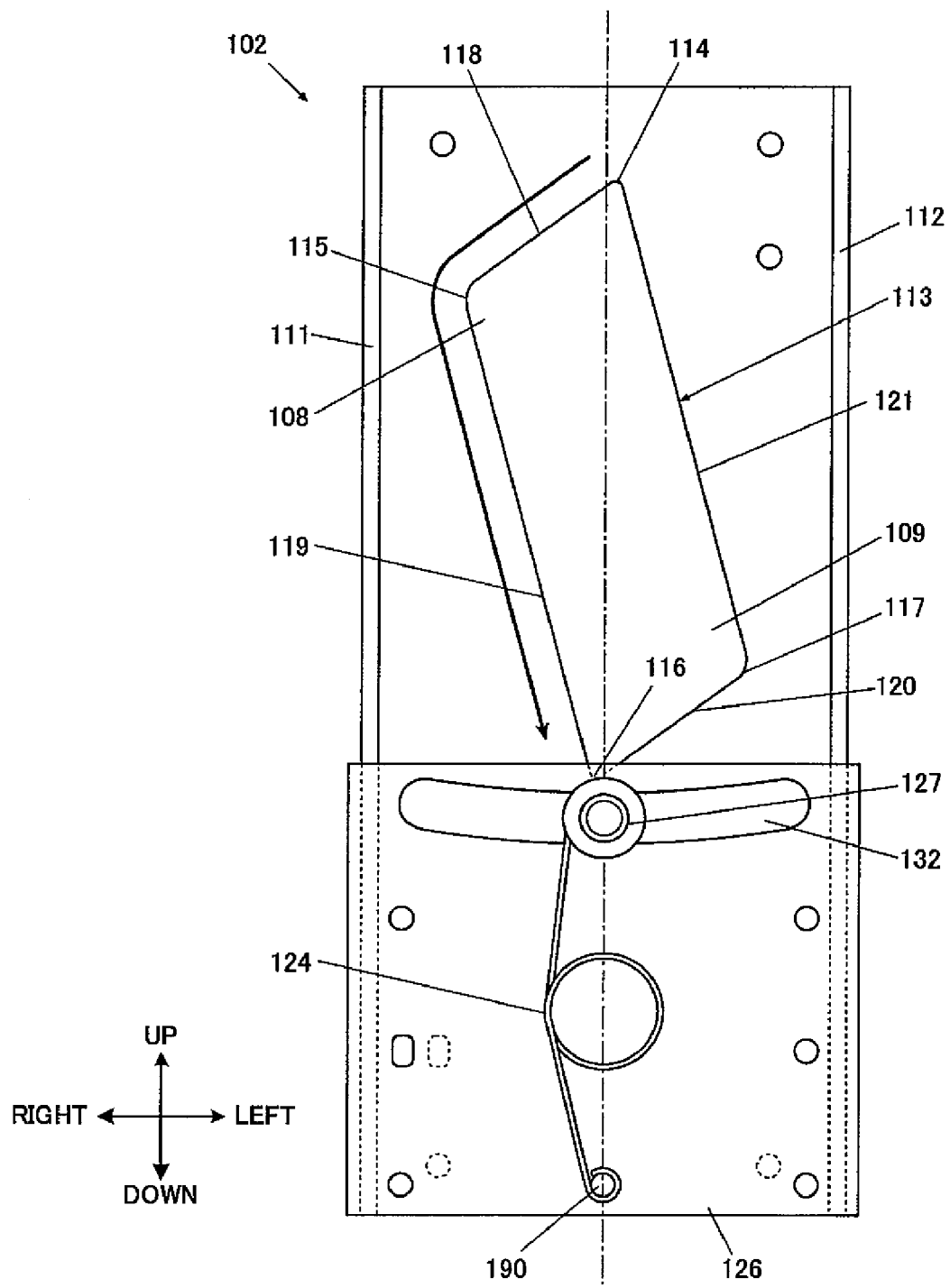
FIG. 18 is another rear view of the slide device.

As shown in FIG. 18, in a state where the lower end of the slider 126 and the lower end of the base 110 meet, the cam follower 127 is positioned at the lateral central section of the guide 132, the cam follower 127 makes contact with the cam surface 120 in the vicinity of the apex 116, and the whole of the input unit 7 provided at the front surface of the front casing 3 of the electronic equipment 1 is exposed.

Figure 19:
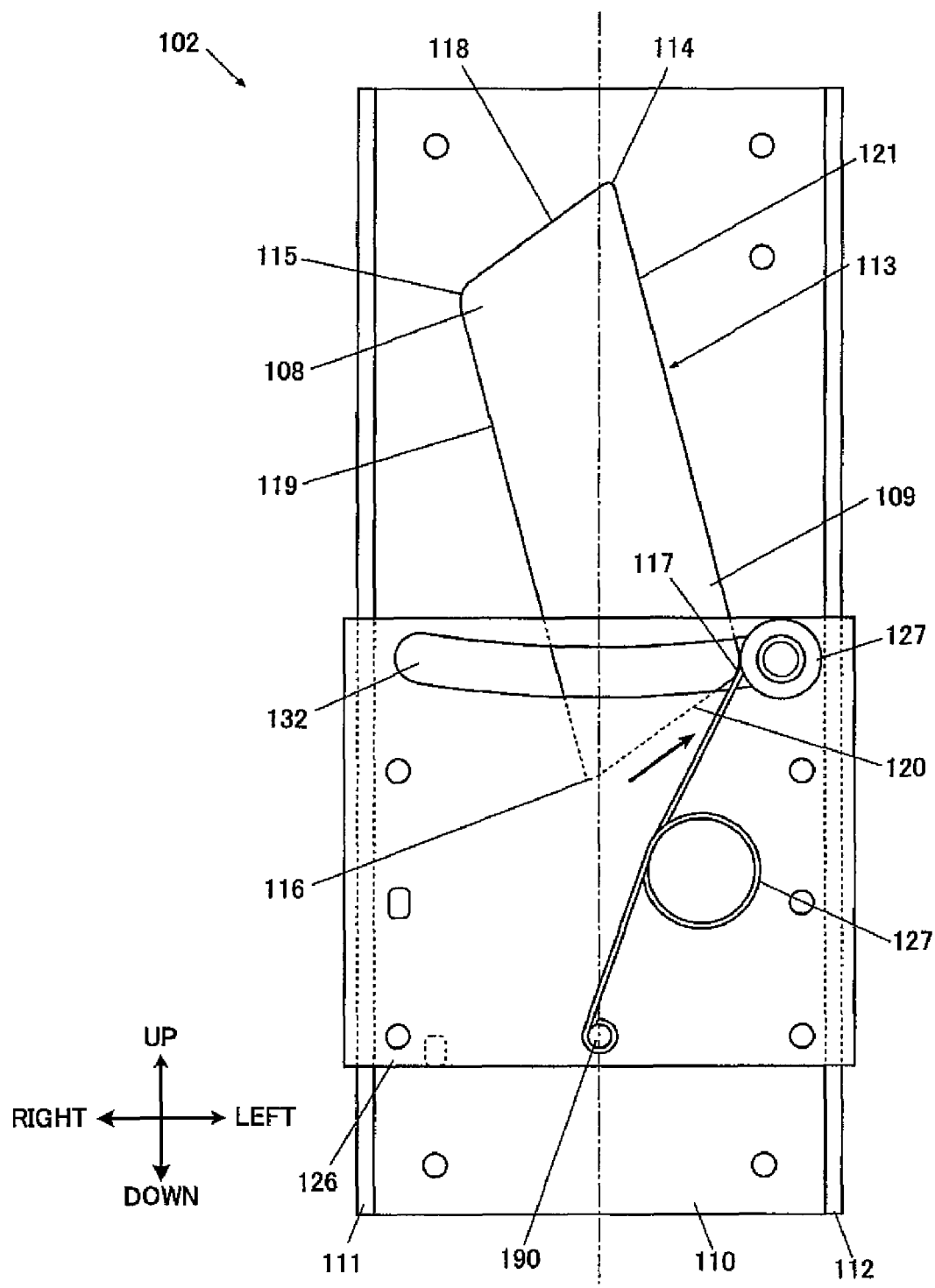
FIG. 19 is a further rear view of the slide device.

The user then slides the front casing 3 downwards with respect to the rear casing 4. In doing so, the cam follower 127 slides along the cam surface 120 and slides along the cam surface 121 after reaching the apex 117 as shown in FIG. 19. When the cam follower 127 is in contact with the cam surface 120, a downward load acts on the slider 126. When the cam follower 127 is in contact with the cam surface 121, an upward load acts on the slider 126.

The user then slides the front casing 3 downwards with respect to the rear casing 4. In doing so, the cam follower 127 is urged towards the center by the urging spring 124 immediately before reaching the apex 114 of the cam 113 and the apex 114 of the cam 113 is traveled over. This then gives the situation shown in FIG. 16.

The present invention is by no means limited to the above embodiment, and the various design modifications of the above embodiment are included in the scope of the present invention.

For example, the limitations of the vertical direction (y-axis direction), the lateral direction (x-axis direction), and the orthogonal condition set thereto used in the description of the embodiment above are provided merely to facilitate understanding of the present invention and can be arbitrarily changed in order to achieve the object of the present invention.

A slide device that has a mirror image relationship with respect to the slide device 102 described using FIGS. 15 to 19 is also possible.

The cam 113 can also be a grooved cam rather than a circumscribing cam.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2008-083648 filed on Mar. 27, 2008, and including specification, claims, drawings and summary. The disclosure of the above Japanese Patent Application is incorporated herein by reference in its entirety.

What is claimed is:

1. A slide device comprising:
    a base;
    a slider provided at the base and slidable along an axis serving as a y-axis with respect to the base;
    a cam provided at the base and having a surface undulating in an x-axis direction orthogonal to the y-axis;
    a cam follower provided at the slider and capable of moving from a position corresponding to one end of the cam in the x-axis direction to a position corresponding to the other end; and
    an urging mechanism urging the cam follower towards the cam such that the cam follower slides and circles around the cam in one direction in accompaniment with reciprocal sliding of the slider with respect to the base.

2. The slide device according to claim 1, wherein the cam comprises:
    a left convex cam section convex to a minus side of the x-axis direction; and
    a right convex cam section convex to a plus side of the x-axis direction, and
    the left convex cam section and the right convex cam section are mutually connected at an upper end section that is an end of the cam on the plus side in the y-axis direction and a lower end section that is an end on the minus side of the cam in the y-axis direction.

3. The slide device according to claim 2, wherein the urging mechanism urges the cam follower towards equilibrium at a central section for the one end and the other end of the cam in the x-axis direction, and one of the upper end section and the lower end section of the cam is positioned to the minus side in the x-axis direction from an equilibrium position of the cam follower, and the other is positioned to the plus side in the x-axis direction from the equilibrium position of the cam follower.

4. The slide device according to claim 3, wherein an apex positioned furthest to the minus side in the x-axis direction of the left convex cam section is positioned closer to one of the upper end section and the lower end section positioned to the plus side of the x-axis direction from the position of equilibrium of the cam follower than to the other, and an apex positioned furthest to the plus side in the x-axis direction of the right convex cam section is positioned closer to one of the upper end section and the lower end section positioned to the minus side in the x-axis direction from the position of equilibrium of the cam follower than to the other.

5. The slide device according to claim 3, wherein the surface on the plus side in the x-axis direction of the two surfaces forming an angle for one of the upper end section and the lower end section positioned to the plus side in the x-axis direction from the position of equilibrium of the cam follower is perpendicular to the direction of movement of the cam follower with respect to the slider, and the surface on the minus side in the x-axis direction of two surfaces forming an angle for one of the upper end section and the lower end section positioned to the minus side in the x-axis direction from the position of equilibrium of the cam follower is perpendicular to the direction of movement of the cam follower with respect to the slider.

6. The slide device according to claim 2, wherein, when the plus side in the x-axis direction is taken to be right, the minus side is taken to be left, the plus side in the y-axis direction is taken to be upwards, and the minus side is taken to be downwards,
    the left convex cam section comprises:
        a first cam surface inclined downwards to the left; and
        a second cam surface inclined downwards to the right from a lower left end of the first cam surface, and
    the right convex cam section comprises:
        a third cam surface inclined upwards to the right from a lower right end of the second cam surface; and
        a fourth cam surface inclined upwards to the left from the upper right end of the third cam surface to the upper right end of the first cam surface.

7. The slide device according to claim 1, wherein the urging mechanism comprises:
- first and second guide members provided at the slider and guided so as to be capable of moving in the x-axis direction with respect to the slider;
- a first spring for urging the first guide member towards the minus side in the x-axis direction with respect to the slider; and
- a second spring for urging the second guide member towards the plus side in the x-axis direction with respect to the slider, the first guide member comprises:
- a first restricting section that restricts movement of the cam follower towards the plus side in the x-axis direction with respect to the first guide member; and
- a first guide that guides the cam follower from the first restricting section to the minus side in the x-axis direction, and the second guide member comprises:
- a second restricting section that restricts movement of the cam follower towards the minus side in the x-axis direction with respect to the second guide member; and
- a second guide that guides the cam follower from the second restricting section to the plus side in the x-axis direction.

8. The slide device according to claim 1, wherein a guide section inclined with respect to the x-axis and the y-axis is formed at the slider, and the cam follower is guided by the guide section.

9. The slide device according to claim 1, wherein the cam follower is a roller follower.

10. Electronic equipment comprising:
a front casing;
a rear casing facing a rear surface of the front casing; and
the slide device according to claim 1,
wherein the base is fitted to a rear surface of the front casing, and the slider is fitted to a front surface of the rear casing.

11. A slide device comprising:
a base;
a slider provided at the base and slidable along an axis serving as a y-axis with respect to the base;
a cam provided at the base and having a surface undulating in an x-axis direction orthogonal to the y-axis;
a cam follower provided at the slider and capable of moving from a position corresponding to one end of the cam in the x-axis direction to a position corresponding to the other end; and
an urging mechanism urging the cam follower towards the cam such that the cam follower slides around the cam in one direction in accompaniment with the sliding of the slider with respect to the base;
wherein a guide section inclined with respect to the x-axis and the y-axis is formed at the slider, and the cam follower is guided by the guide section; and
wherein a recess enabling the cam follower to escape to above the guide section at a position where the cam follower neighbors the upper end section of the cam and a recess enabling the cam follower to escape to below the guide section at a position where the cam follower neighbors the lower end section of the cam are formed at the slider.

* * * * *